US012754723B2

(12) United States Patent
Doinea et al.

(10) Patent No.: US 12,754,723 B2
(45) Date of Patent: Oct. 6, 2026

(54) CONVERTING DATA FROM AN OPTIMIZED FORMAT TO A TARGET FORMAT

(71) Applicant: Oracle International Corporation, Redwood Shores, CA (US)

(72) Inventors: Laurentiu-Mihai Doinea, Bucharest (RO); Marius Trufas, Bucharest (RO)

(73) Assignee: Oracle International Corporation, Redwood Shores, CA (US)

( * ) Notice: Subject to any disclaimer, the term of this patent is extended or adjusted under 35 U.S.C. 154(b) by 204 days.

(21) Appl. No.: 18/659,976

(22) Filed: May 9, 2024

(65) Prior Publication Data

US 2025/0348295 A1 Nov. 13, 2025

(51) Int. Cl.
*G06F 8/41* (2018.01)
*G06F 9/455* (2018.01)

(52) U.S. Cl.
CPC .......... *G06F 8/443* (2013.01); *G06F 9/45516* (2013.01)

(58) Field of Classification Search
CPC ............................. G06F 8/443; G06F 9/45516
See application file for complete search history.

(56) References Cited

U.S. PATENT DOCUMENTS

| | | | |
|---|---|---|---|
| 6,510,516 B1 | 1/2003 | Benson et al. | |
| 8,196,131 B1 | 6/2012 | Von et al. | |
| 9,426,543 B1 | 8/2016 | Li et al. | |
| 11,176,175 B1 * | 11/2021 | Snyder | G06F 16/254 |
| 11,729,292 B1 | 8/2023 | Hyndman | |
| 2002/0093856 A1 | 7/2002 | Baentsch et al. | |

(Continued)

FOREIGN PATENT DOCUMENTS

| | | |
|---|---|---|
| CN | 105404794 A | 3/2016 |
| EP | 1830263 A2 | 9/2007 |

(Continued)

OTHER PUBLICATIONS

"GlobalPlatform Card API—ELF Upgrade API", v1.1.1, Retrieved from https://globalplatform.org/specs-library/globalplatform-card-api-org-globalplatform-upgrade/, Feb. 2022, pp. 1-4.

(Continued)

*Primary Examiner* — Ziaul A Chowdhury
(74) *Attorney, Agent, or Firm* — Invoke

(57) ABSTRACT

Techniques are disclosed for converting a dataset from an optimized format to a target format. The system determines a hierarchy of types that are included within the dataset. Based on the hierarchy of types, the system identifies occurrences of the same method in the dataset. The same name is assigned to occurrences of the same method. Optimized opcodes included in the bytecode instructions of methods are translated into target opcodes. For each method, the system simulates executing the target opcodes that replace the optimized opcodes in the method to determine if the target opcodes affect the configuration of local variables differently than the optimized opcodes. Based on simulating the execution of the target opcodes, the system alters local variable references in the method to reflect the differing configurations of local variables that result from replacing the optimized opcodes with the target opcodes.

20 Claims, 11 Drawing Sheets

(56) References Cited

U.S. PATENT DOCUMENTS

| | | | | |
|---|---|---|---|---|
| 2004/0107222 | A1 | 6/2004 | Venkatesh et al. | |
| 2004/0143820 | A1 | 7/2004 | Jong | |
| 2004/0193759 | A1 | 9/2004 | Scott et al. | |
| 2006/0004895 | A1 | 1/2006 | Kim | |
| 2007/0169043 | A1 | 7/2007 | Molleau et al. | |
| 2013/0024700 | A1 | 1/2013 | Peterson et al. | |
| 2015/0134958 | A1 | 5/2015 | Merrien et al. | |
| 2015/0181647 | A1 * | 6/2015 | Takahashi | H04W 88/16 370/338 |
| 2018/0144137 | A1 | 5/2018 | Rhelimi et al. | |
| 2020/0356468 | A1 | 11/2020 | Fugate et al. | |
| 2022/0191251 | A1 | 6/2022 | Gavish et al. | |
| 2024/0329981 | A1 * | 10/2024 | Cockerham | G06F 8/72 |

FOREIGN PATENT DOCUMENTS

| | | | | |
|---|---|---|---|---|
| EP | 3291084 | A1 | 3/2018 | |
| WO | WO-2015164439 | A1 * | 10/2015 | G06F 8/41 |
| WO | 2018/042016 | A1 | 3/2018 | |

OTHER PUBLICATIONS

Global Platform, Card Specification, Version 2.3, Oct. 2015, pp. 1-335.

GlobalPlatform Technology, Executable Load File Upgrade, Card Specification v2.3 Amendment H, Version 1.1, Mar. 2018, pp. 1-52.

"Baseline Security Recommendations for IoT", Retrieved at https://www.enisa.europa.eu/publications/baseline-security-recommendations-for-iot, Nov. 20, 2017, 3 Pages.

"Java Card™ Platform, Virtual Machine Specification, Classic Edition", Version 3.1, Feb. 2021, pp. 1-274.

"MIPI I3C and I3C Basic", Retrieved at https://www.mipi.org/specifications/i3c-sensor-specification, Retrieved on May 2022, 8 Pages.

"NIST Releases Draft Guidance on Internet of Things Device Cybersecurity", Retrieved at https://www.nist.gov/news-events/news/2020/12/nist-releases-draft-guidance-internet-things-device-cybersecurity, Retrieved on May 2022, 3 Pages.

Anonymous et al: "The CAP File Format", Retrieved from http://pfa12.free.fr/doc_java/javacard_specifications/specs/jcvm/html/JCVM06cap.html#53140, Retrieved on Apr. 25, 2024, pp. 1-41.

Tip et al., "Practical experience with an application extractor for Java", ACM SIGPLAN Notices, vol. 34, No. 10, 1999, pp. 292-305.

* cited by examiner

CONVERTING DATA FROM AN OPTIMIZED FORMAT TO A TARGET FORMAT

TECHNICAL FIELD

The present disclosure relates to converting data from an optimized format to a target format.

BACKGROUND

Software may be optimized for a particular computing environment. For example, software (e.g., an operating system, an application, a library, etc.) may be optimized for a computing environment that possesses limited processing and/or memory resources. An example optimization to software that is intended for a resource-constrained environment reduces the size and/or complexity of the software.

A binary digit (referred to herein as a "bit") is a basic unit of information in computing. A bit is used to represent binary data. A bit can have one of two possible values: zero or one. Multiple bits can be combined to represent more complex values. Multiple bits are often delineated in eight-bit quantities. A quantity of eight bits may be referred to herein as a "byte."

The processing ability of a computing system may be partially characterized in terms of the number of bits that the computing system is capable of processing as a unit. For instance, an eight-bit computing system is a computing system that can process information one byte at a time. Similarly, a 16-bit computing system can process data in 16-bit quantities, a 32-bit computing system can process data in 32-bit quantities, and a 64-bit computing system can process data in 64-bit quantities.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
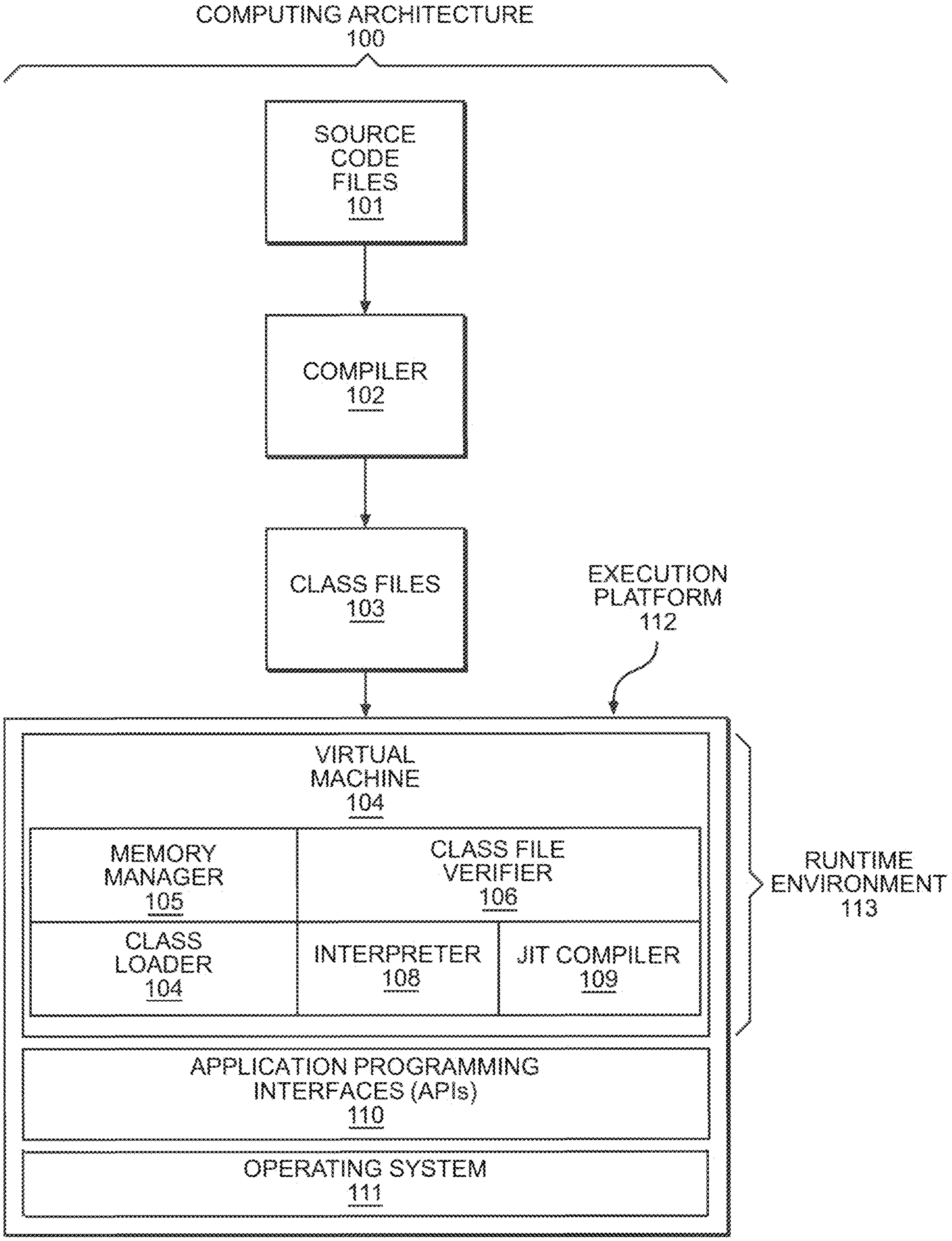
FIG. 1 illustrates an example computing architecture according to an embodiment.

In the following description, for the purposes of explanation, numerous specific details are set forth to provide a thorough understanding. One or more embodiments may be practiced without these specific details. Features described in one embodiment may be combined with features described in a different embodiment. In some examples, well-known structures and devices are described with reference to a block diagram form to avoid unnecessarily obscuring the present invention.

The following table of contents is provided for the reader's convenience and is not intended to define the limits of the disclosure.

1. GENERAL OVERVIEW
2. ARCHITECTURAL OVERVIEW
   2.1 EXAMPLE ARCHITECTURE
   2.2. EXAMPLE CLASS FILE STRUCTURE
   2.3 EXAMPLE VIRTUAL MACHINE ARCHITECTURE
   2.4. LOADING, LINKING, AND INITIALIZING
   2.5. EXAMPLE OPTIMIZED ARCHITECTURE
   2.6. EXAMPLE CONVERTED APPLET FILE STRUCTURE
3. NAMING ELEMENTS OF AN OPTIMIZED DATASET
4. TRANSLATING BYTECODE INSTRUCTIONS
5. EXAMPLE EMBODIMENT
   5.1. EXAMPLE REFERENCE TYPE HIERARCHY
   5.2. EXAMPLE OPCODE SUBSTITUTION
6. HARDWARE OVERVIEW
7. MISCELLANEOUS; EXTENSIONS

1. General Overview

One or more embodiments convert a dataset from an optimized format to a target format by determining names for elements of the dataset, by translating optimized opcodes into target opcodes, and by mapping references to optimized local variables to target local variables. For example, the system may convert a dataset from a converted applet file format to a class file format by determining names for elements that are represented by numbered tokens in the converted applet file, by translating Java Card Virtual Machine opcodes into Java Virtual Machine opcodes, and by mapping references to Java Card Virtual Machine local variables to Java Virtual Machine local variables.

An embodiment determines name(s) for element(s) of a dataset. The dataset complies with an optimized format. The optimized format dictates that certain elements (e.g., certain packages, reference types, methods, fields, etc.) are represented by numbers rather than names. In contrast, a target format dictates that the certain elements are represented by names rather than numbers. Thus, to convert the dataset from the optimized format to the target format, the system determines a name for each element in the dataset that is represented by a number rather than a name.

An embodiment determines an original name of an element or generates a new name for the element. The element is included in a dataset that complies with an optimized format. The element is represented in the dataset by a number. The dataset was previously converted from a target format to an optimized format. The target format dictates that the element is represented by a name. Thus, the element was originally represented by a name (referred to herein as an "original name") rather than a number. If the system can determine the original name of the element, the system uses the original name of the element when reverting the dataset to the target format. If the system cannot determine the original name of the element, the system generates a new name for the element.

An embodiment determines a hierarchy of reference types that are included in a dataset. The hierarchy defines direct and indirect abstract relationships between reference types. An example abstract relationship is created by extension, implementation, and/or other mechanisms. A reference type (e.g., a class or interface) is higher in the hierarchy than a corresponding derivative reference type (e.g., a subclass or subinterface). An interface is higher in the hierarchy than a class that implements the interface.

An embodiment identifies occurrences of the same method in a dataset that accords to an optimized format. As used herein, "occurrences of the same method" refers to methods of a dataset that would be represented by the same name in a target format. It should be noted that occurrences of the same method may be represented by different numbers in an optimized format. It should also be noted that, in an optimized format, different methods may be represented by the same number. Consequently, the system may not be able to determine if two or more methods are occurrences of the same methods based solely on the numbers that represent the two or more methods.

An embodiment identifies occurrences of the same method in a dataset that accords to an optimized format based on a hierarchy of reference types in the dataset. In an example, the hierarchy indicates that a derivative reference type (e.g., a class or interface) extends (directly or indirectly) another reference type (e.g., a superclass or superinterface). In this example, the system is able to infer that an inherited method of the derivative reference type and a method defined in the other reference type are occurrences of the same method. In another example, the hierarchy indicates that a class implements (directly or indirectly) an interface. In this example, the system is able to infer that a concrete method defined in the class and an abstract method declared in the interface are occurrences of the same method.

An embodiment assigns the same name to occurrences of the same method. As a result, the system preserves functionality that is associated with abstract relationships between reference types that might otherwise be lost upon conversion to a target format. As an example, consider a class that implements an interface. The class defines a concrete method that is intended to provide implementation to an abstract method declared in the interface. However, if the concrete method and the abstract method are assigned different method names (and therefore different method signatures) the concrete method will not provide implementation to the abstract method, and the class becomes an abstract class. Furthermore, this may result in the failure of an attempt to invoke the method body of the concrete method through the interface.

An embodiment replaces optimized opcode(s) in a method with target opcode(s). An opcode of an optimized opcode vocabulary (referred to herein as an "optimized opcode") may be functionally equivalent to an opcode of a target opcode vocabulary (referred to herein as a "target opcode"). However, some optimized opcodes are not functionally equivalent to a target opcode. If the system cannot replicate the functionality of an optimized opcode with a single target opcode, the system determines a combination of target opcodes that replicates the functionality of the optimized opcode. By replacing the optimized opcode(s) of the method with target opcode(s), the system may convert the method from an optimized format to a target format.

An embodiment simulates the execution of a target opcode that has been selected to replace an optimized opcode of a method. The system simulates the execution of the target opcode to determine if the target opcode affects the configuration of local variables differently than the optimized opcode. For example, the system may determine if the target opcode stores values in local variables differently than the optimized opcode. If the target opcode affects the configuration of local variables differently than the optimized opcode, a subsequent reference in the method to a local variable may reference the wrong value. Thus, if the system determines that the target opcode impacts the configuration of local variables differently than the optimized opcode, the system may alter subsequent references to local variables in the method.

An embodiment simulates the execution of multiple target opcodes to determine how the configuration of local variables evolves throughout the course of a method. It should be noted that the impact of an opcode that alters the configuration of local variables (e.g., an opcode that stores a value to a local variable) is cumulative with the impact of any other opcodes in the same method that alter the configuration of local variables. Consequently, a reference to a local variable that occurs later in the method may be further astray than a reference to a local variable that occurs earlier in the method. As such, the system may simulate the execution of each target opcode that replaces an optimized opcode in the method to determine how the configuration of local variables evolves throughout the method. For each local variable reference in the method, the system may consult a predicted configuration of local variables at the point in the method where the local variable reference occurs to determine an appropriate modification to the local variable reference.

One or more embodiments described in this Specification and/or recited in the claims may not be included in this General Overview section.

2. Architectural Overview

2.1 Example Architecture

FIG. 1 illustrates an example architecture that techniques described herein may be practiced. Software and/or hardware components described with relation to the example architecture may be omitted or associated with a different set of functionalities than described herein. Software and/or hardware components, not described herein, may be used within an environment in accordance with one or more embodiments. Accordingly, the example environment should not be constructed as limiting the scope of any of the claims.

As illustrated in FIG. 1, a computing architecture 100 includes source code files 101 that are compiled by a compiler 102 into class files 103 representing the program to be executed. The class files 103 are then loaded and executed by an execution platform 112, that includes a runtime environment 113, an operating system 111, and one or more application programming interfaces (APIs) 110 that enable communication between the runtime environment 113 and the operating system 111. The runtime environment 113 includes a virtual machine 104 comprising various components, such as a memory manager 105 (that may include a garbage collector), a class file verifier 106 to check the validity of class files 103, a class loader 107 to locate and build in-memory representations of classes, an interpreter 108 for executing the virtual machine 104 code, and a just-in-time (JIT) compiler 109 for producing optimized machine-level code.

In an embodiment, the computing architecture 100 includes source code files 101 that contain code that has been written in a particular programming language, such as Java, C, C++, C#, Ruby, Perl, and so forth. Thus, the source code files 101 adhere to a particular set of syntactic and/or semantic rules for the associated language. For example, code written in Java adheres to the Java Language Specification. However, since specifications are updated and revised over time, the source code files 101 may be associated with a version number indicating the revision of the specification that the source code files 101 adhere to. The exact programming language used to write the source code files 101 is generally not critical.

In various embodiments, the compiler 102 converts the source code, that is written according to a specification directed to the convenience of the programmer, to either machine or object code, that is executable directly by the particular machine environment, or an intermediate representation ("virtual machine code/instructions"), such as bytecode that is executable by a virtual machine 104 that is capable of running on top of a variety of particular machine environments. The virtual machine instructions are executable by the virtual machine 104 in a more direct and efficient manner than the source code. Converting source code to virtual machine instructions includes mapping source code functionality from the language to virtual machine functionality that utilizes underlying resources, such as data structures. Often, functionality that is presented in simple terms via source code by the programmer is converted into more complex steps that map more directly to the instruction set supported by the underlying hardware that the virtual machine 104 resides on.

In general, programs are executed either as a compiled or an interpreted program. When a program is compiled, the code is transformed globally from a first language to a second language before execution. Since the work of transforming the code is performed ahead of time; compiled code tends to have excellent run-time performance. In addition, since the transformation occurs globally before execution, the code can be analyzed and optimized using techniques such as constant folding, dead code elimination, inlining, and so forth. However, depending on the program being executed, the startup time can be significant. In addition, inserting new code would require the program to be taken offline, re-compiled, and re-executed. For many dynamic languages (such as Java) that are designed to allow code to be inserted during the program's execution, a purely compiled approach may be inappropriate. When a program is interpreted, the code of the program is read line-by-line and converted to machine-level instructions while the program is executing. As a result, the program has a short startup time (can begin executing almost immediately), but the run-time performance is diminished by performing the transformation on the fly. Furthermore, since each instruction is analyzed individually, many optimizations that rely on a more global analysis of the program cannot be performed.

In some embodiments, the virtual machine 104 includes an interpreter 108 and a JIT compiler 109 (or a component implementing aspects of both) and executes programs using a combination of interpreted and compiled techniques. For example, the virtual machine 104 may initially begin by interpreting the virtual machine instructions representing the program via the interpreter 108 while tracking statistics related to program behavior, such as how often different sections or blocks of code are executed by the virtual machine 104. Once a block of code surpasses a threshold (is "hot"), the virtual machine 104 invokes the JIT compiler 109 to perform an analysis of the block and generate optimized machine-level instructions that replaces the "hot" block of code for future executions. Since programs tend to spend most time executing a small portion of overall code, compiling just the "hot" portions of the program can provide similar performance to fully compiled code, but without the start-up penalty. Furthermore, although the optimization analysis is constrained to the "hot" block being replaced, there still exists far greater optimization potential than converting each instruction individually. There are a number of variations on the above-described example, such as tiered compiling.

In order to provide clear examples, the source code files 101 have been illustrated as the "top level" representation of the program to be executed by the execution platform 112. Although the computing architecture 100 depicts the source code files 101 as a "top level" program representation, in other embodiments the source code files 101 may be an intermediate representation received via a "higher level" compiler that processed code files in a different language into the language of the source code files 101. Some examples in the following disclosure assume that the source code files 101 adhere to a class-based object-oriented programming language. However, this is not a requirement to utilize the features described herein.

In an embodiment, compiler 102 receives as input the source code files 101 and converts the source code files 101 into class files 103 that are in a format expected by the virtual machine 104. For example, in the context of the Java Virtual Machine (JVM), the JVM Specification defines a particular class file format that the class files 103 are expected to adhere to. In some embodiments, the class files 103 contain the virtual machine instructions that have been converted from the source code files 101. However, in other embodiments, the class files 103 may contain other structures as well, such as tables identifying constant values and/or metadata related to various structures (classes, fields, methods, and so forth).

In an embodiment, class files 103 represents types. As used herein, a "type" refers to a primitive type, a reference type, a null type, and/or other categories of types. A reference type, such as a class or an interface, may declare and/or define a method. As used herein, "declaring" a method refers to providing a method signature for the method, and "defining" a method refers to providing a method signature for the method and implementation (i.e., a method body) for the method. A reference type that defines a method also declares the method.

In an embodiment, a class file 103 represents a class. A class may include abstract methods and/or concrete methods. An abstract method is a method with no method body (i.e., declared but not defined). A class that includes an abstract method is an abstract class. A concrete method is a method that is defined by a class. A method that is declared or defined in a class may be referred to herein as a "class method."

In an embodiment, a class represented by a class file 103 is a subclass and/or a superclass. If a class extends another class, the class is a subclass, and the other class is a superclass. A subclass that extends a superclass may inherit methods and/or fields from the superclass, provide implementation to an abstract method declared in the superclass, and/or override a virtual method defined in the superclass. A class may simultaneously be a subclass and a superclass. An extension relationship between a subclass and a superclass may be direct or indirect. A subclass can only have one direct superclass but may have multiple indirect superclasses. As an example, assume that class C extends class B and class B extends class A. In this example, class B is the direct superclass of class C, and class A is the direct superclass of class B. Furthermore, class A is an indirect superclass of class C. The extension relationship between a subclass and a corresponding superclass (direct or indirect) is an example of an abstract relationship between reference types.

In an embodiment, a class file 103 represents an interface. An interface may declare abstract methods and/or default methods. A default method is a method defined in an interface. An interface may be abstract or non-abstract. An interface is abstract if the interface declares an abstract method. A method that is declared or defined in an interface may be referred to herein as an "interface method." An interface may be implemented by a class. A class that implements an interface may provide implementation for an abstract method declared in the interface, inherit default methods and/or fields from the interface, and/or override default methods defined in the interface. A class becomes an abstract class if the class implements an interface but does not provide implementation for an abstract method declared in the interface. An interface may be directly or indirectly implemented by another reference type. As an example, assume that class B extends class A, and that class B implements an interface. In this example, the interface is directly implemented by class B, and the interface may be indirectly implemented by class A. An interface can be directly implemented by multiple classes. Furthermore, an interface can be indirectly implemented by multiple reference types. While an interface cannot be directly implemented by another interface, an interface may be indirectly implemented by another interface. The relationship between an interface and a reference type that implements the interface (directly or indirectly) is an example of an abstract relationship between reference types.

In an embodiment, an interface represented by a class file 103 may be a subinterface and/or a superinterface. If an interface extends another interface, the interface is a subinterface and the other interface is a superinterface. A subinterface that extends a superinterface may inherit fields and/or methods from the superinterface, provide implementation to an abstract method declared in the superinterface, and/or override a default method defined in the superinterface. An interface may be a subinterface and a superinterface simultaneously. A relationship between a subinterface and a superinterface may be direct or indirect. A subinterface can have multiple direct superinterfaces and multiple indirect superinterfaces. The relationship between a subinterface and a corresponding superinterface (direct or indirect) is an example of an abstract relationship between reference types.

The following discussion assumes that each of the class files 103 represents a respective "type" defined in the source code files 101 (or dynamically generated by the compiler 102/virtual machine 104). However, the aforementioned assumption is not a strict requirement and will depend on the implementation of the virtual machine 104. Thus, the techniques described herein may still be performed regardless of the exact format of the class files 103. In some embodiments, the class files 103 are divided into one or more "packages", that each include a collection of types that provide related functionality. For example, a package may contain one or more class files that implement input/output (I/O) operations, mathematics tools, cryptographic techniques, graphics utilities, and so forth. Further, some types (or fields/methods within those types) may include access restrictions that limit their use to within a particular type/package or to types with appropriate permissions.

2.2 Example Class File Structure

Figure 2:
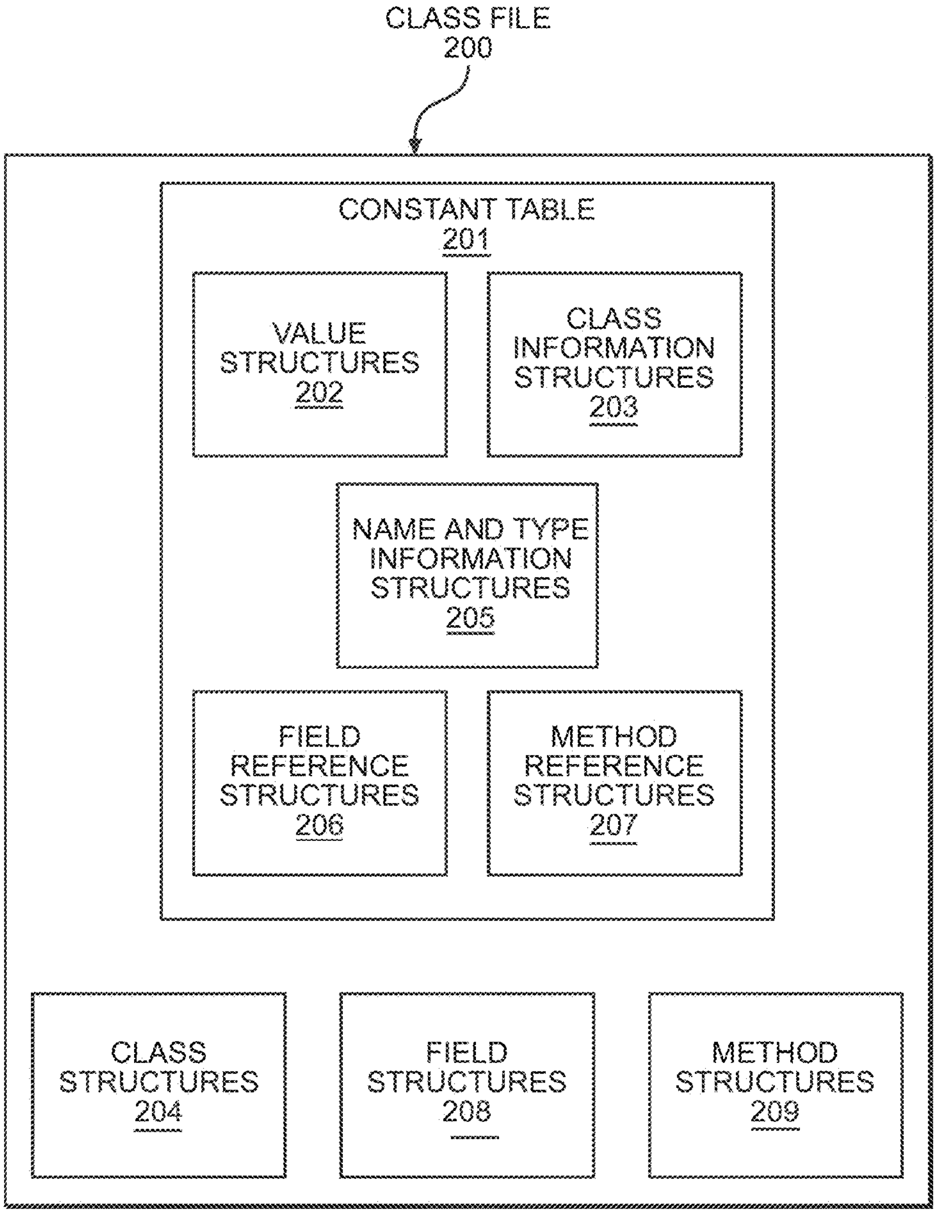
FIG. 2 illustrates an example structure for a class file in block diagram form according to an embodiment.

FIG. 2 illustrates an example structure for a class file 200 in block diagram form according to an embodiment. In order to provide clear examples, the remainder of the disclosure assumes that the class files 103 of the computing architecture 100 adhere to the structure of the example class file 200 described in this section. However, in a practical environment, the structure of the class file 200 will be dependent on the implementation of the virtual machine 104. Further, one or more features discussed herein may modify the structure of the class file 200 to, for example, add additional structure types. Therefore, the exact structure of the class file 200 is not critical to the techniques described herein. For the purposes of Section 2.1, "the class" or "the present class" refers to the class represented by the class file 200.

In FIG. 2, the class file 200 includes a constant table 201, field structures 208, class metadata 207, and method structures 209. In an embodiment, the constant table 201 is a data structure that, among other functions, acts as a symbol table for the class. For example, the constant table 201 may store data related to the various identifiers used in the source code files 101 such as type, scope, contents, and/or location. The constant table 201 has entries for value structures 202 (representing constant values of type int, long, double, float, byte, string, and so forth), class information structures 203, name and type information structures 204, field reference structures 205, and method reference structures 206 derived from the source code files 101 by the compiler 102. In an embodiment, the constant table 201 is implemented as an array that maps an index i to structure j. However, the exact implementation of the constant table 201 is not critical.

In some embodiments, the entries of the constant table 201 include structures that index other constant table 201 entries. For example, an entry for one of the value structures 202 representing a string may hold a tag identifying its "type" as string and an index to one or more other value structures 202 of the constant table 201 storing char, byte or int values representing the ASCII characters of the string.

In an embodiment, field reference structures 205 of the constant table 201 hold an index into the constant table 201 to one of the class information structures 203 representing the class defining the field and an index into the constant table 201 to one of the name and type information structures 204 that provides the name and descriptor of the field. Method reference structures 206 of the constant table 201 hold an index into the constant table 201 to one of the class information structures 203 representing the class defining the method and an index into the constant table 201 to one of the name and type information structures 204 that provides the name and descriptor for the method. The class information structures 203 hold an index into the constant table 201 to one of the value structures 202 holding the name of the associated class.

The name and type information structures 204 hold an index into the constant table 201 to one of the value structures 202 storing the name of the field/method and an index into the constant table 201 to one of the value structures 202 storing the descriptor.

In an embodiment, class metadata 207 includes metadata for the class, such as version number(s), number of entries in the constant pool, number of fields, number of methods, access flags (whether the class is public, private, final, abstract, etc.), an index to one of the class information structures 203 of the constant table 201 that identifies the present class, an index to one of the class information structures 203 of the constant table 201 that identifies the superclass (if any), and so forth.

In an embodiment, the field structures 208 represent a set of structures that identifies the various fields of the class. The field structures 208 store, for each field of the class, accessor flags for the field (whether the field is static, public, private, final, etc.), an index into the constant table 201 to one of the value structures 202 that holds the name of the field, and an index into the constant table 201 to one of the value structures 202 that holds a descriptor of the field.

In an embodiment, the method structures 209 represent a set of structures that identifies the various methods of the class. The method structures 209 store, for each method of the class, accessor flags for the method (e.g. whether the method is static, public, private, synchronized, etc.), an index into the constant table 201 to one of the value structures 202 that holds the name of the method, an index into the constant table 201 to one of the value structures 202 that holds the descriptor of the method, and the virtual machine instructions that correspond to the body of the method as defined in the source code files 101.

In an embodiment, a descriptor represents a type of a field or method. For example, the descriptor may be implemented as a string adhering to a particular syntax. While the exact syntax is not critical, a few examples are described below.

In an example where the descriptor represents a type of the field, the descriptor identifies the type of data held by the field. In an embodiment, a field can hold a basic type, an object, or an array. When a field holds a basic type, the descriptor is a string that identifies the basic type (e.g., "B"=byte, "C"=char, "D"=double, "F"=float, "I"=int, "J"=long int, etc.). When a field holds an object, the descriptor is a string that identifies the class name of the object (e.g. "L ClassName"). "L" in this case indicates a reference, thus "L ClassName" represents a reference to an object of class ClassName. When the field is an array, the descriptor identifies the type held by the array. For example, "[B" indicates an array of bytes, with "[" indicating an array and "B" indicating that the array holds the basic type of byte. However, since arrays can be nested, the descriptor for an array may also indicate the nesting. For example, "[[L ClassName" indicates an array where each index holds an array that holds objects of class ClassName. In some embodiments, the ClassName is fully qualified and includes the simple name of the class, as well as the pathname of the class. For example, the ClassName may indicate where the file is stored in the package, library, or file system hosting the class file 200.

In the case of a method, the descriptor identifies the parameters of the method and the return type of the method. For example, a method descriptor may follow the general form "({ParameterDescriptor}) ReturnDescriptor", where the {ParameterDescriptor} is a list of field descriptors representing the parameters and the ReturnDescriptor is a field descriptor identifying the return type. For instance, the string "V" may be used to represent the void return type. Thus, a method defined in the source code files 101 as "Object m(int I, double d, Thread t) { . . . }" matches the descriptor "(I D L Thread) L Object".

In an embodiment, the virtual machine instructions held in the method structures 209 include operations that reference entries of the constant table 201. Using Java as an example, consider the following class:

```
class A
{
  int add12and13( ) {
      return B.addTwo(12, 13);
    }
  }
```

In the above example, the Java method add12and13 is defined in class A, takes no parameters, and returns an integer. The body of method add12and13 calls static method addTwo of class B that takes the constant integer values 12 and 13 as parameters, and returns the result. Thus, in the constant table 201, the compiler 102 includes, among other entries, a method reference structure that corresponds to the call to the method B.addTwo. In Java, a call to a method compiles down to an invoke command in the bytecode of the JVM (in this case invokestatic as addTwo is a static method of class B). The invoke command is provided an index into the constant table 201 corresponding to the method reference structure that identifies the class defining addTwo "B", the name of addTwo "addTwo", and the descriptor of addTwo "(I I)I". For example, assuming the aforementioned method reference is stored at index 4, the bytecode instruction may appear as "invokestatic #4".

Since the constant table 201 refers to classes, methods, and fields symbolically with structures carrying identifying information, rather than direct references to a memory location, the entries of the constant table 201 are referred to as "symbolic references". One reason that symbolic references are utilized for the class files 103 is because, in some embodiments, the compiler 102 is unaware of how and where the classes will be stored once loaded into the runtime environment 113. As will be described in Section 2.3, eventually the run-time representations of the symbolic references are resolved into actual memory addresses by the virtual machine 104 after the referenced classes (and associated structures) have been loaded into the runtime environment and allocated concrete memory locations.

2.3 Example Virtual Machine Architecture

Figure 3:
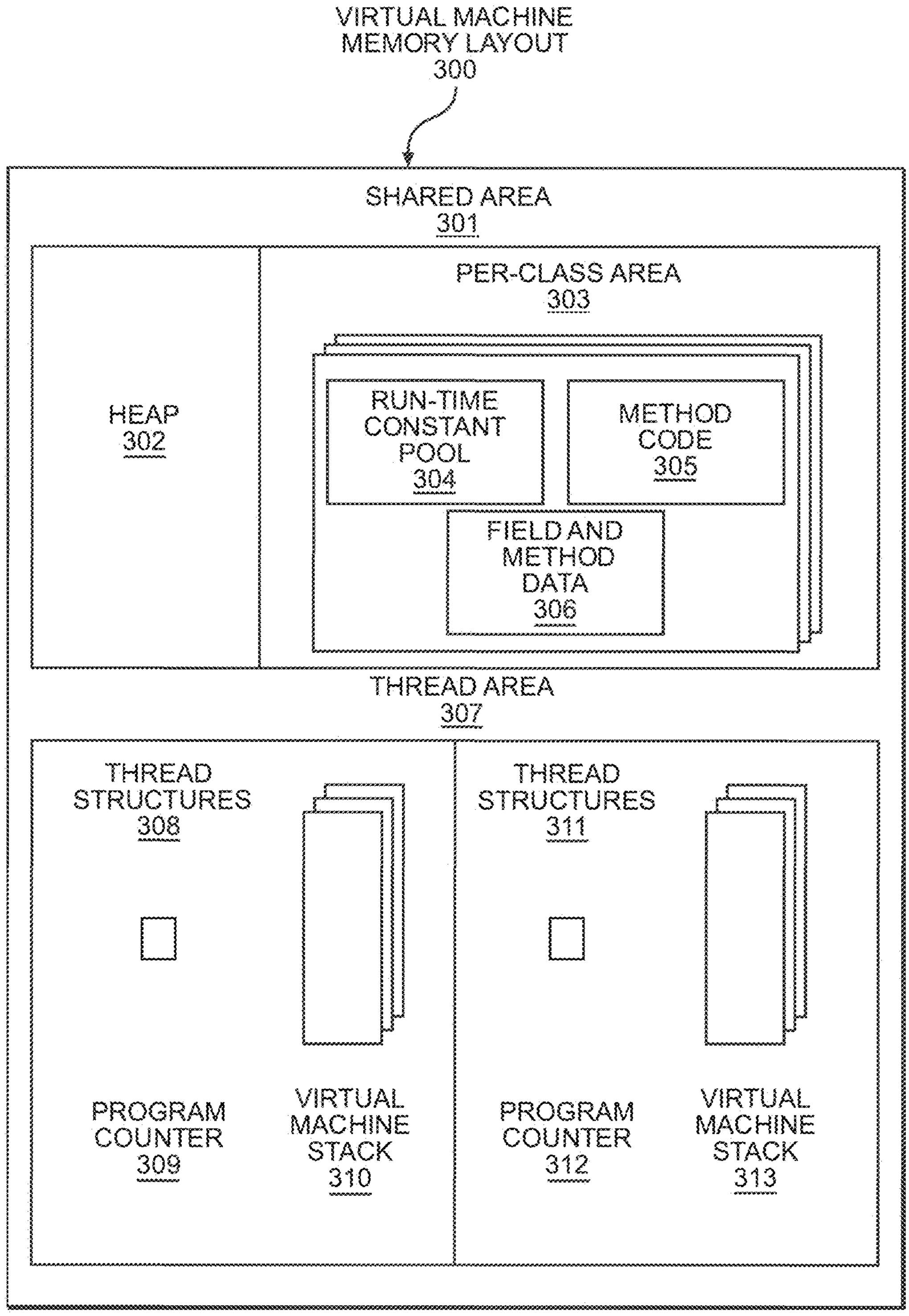
FIG. 3 illustrates an example virtual machine memory layout in block diagram form according to an embodiment.

FIG. 3 illustrates an example virtual machine memory layout 300 in block diagram form according to an embodiment. In order to provide clear examples, the remaining discussion will assume that the virtual machine 104 adheres to the virtual machine memory layout 300 depicted in FIG. 3. In addition, although components of the virtual machine memory layout 300 may be referred to as memory "areas", there is no requirement that the memory areas be contiguous.

In the example illustrated by FIG. 3, the virtual machine memory layout 300 is divided into a shared area 301 and a thread area 307. The shared area 301 represents an area in memory where structures shared among the various threads executing on the virtual machine 104 are stored. The shared area 301 includes a heap 302 and a per-class area 303. In an embodiment, the heap 302 represents the run-time data area that memory for class instances and arrays is allocated to. In an embodiment, the per-class area 303 represents the memory area where the data pertaining to the individual classes are stored. In an embodiment, the per-class area 303 includes, for each loaded class, a run-time constant pool 304 representing data from the constant table 201 of the class, field and method data 306 (for example, to hold the static fields of the class), and the method code 305 representing the virtual machine instructions for methods of the class.

The thread area 307 represents a memory area where structures specific to individual threads are stored. In FIG. 3, the thread area 307 includes thread structures 308 and thread structures 311, representing the per-thread structures utilized by different threads. In order to provide clear examples, the thread area 307 depicted in FIG. 3 assumes two threads are executing on the virtual machine 104. However, in a practical environment, the virtual machine 104 may execute any arbitrary number of threads, with the number of thread structures scaled accordingly.

In an embodiment, thread structures 308 includes program counter 309 and virtual machine stack 310. Similarly, thread structures 311 includes program counter 312 and virtual machine stack 313. In an embodiment, program counter 309 and program counter 312 store the current address of the virtual machine instruction being executed by their respective threads.

Thus, as a thread steps through the instructions, the program counters are updated to maintain an index to the current instruction. In an embodiment, virtual machine stack 310 and virtual machine stack 313 each store frames for their respective threads that hold local variables and partial results and is also used for method invocation and return.

In an embodiment, a frame is a data structure used to store data and partial results, return values for methods, and perform dynamic linking. A new frame is created each time a method is invoked. A frame is destroyed when the method that caused the frame to be generated completes. Thus, when a thread performs a method invocation, the virtual machine 104 generates a new frame and pushes that frame onto the virtual machine stack associated with the thread.

When the method invocation completes, the virtual machine 104 passes back the result of the method invocation to the previous frame and pops the current frame off of the stack. In an embodiment, for a given thread, one frame is active at any point. This active frame is referred to as the current frame, the method that caused generation of the current frame is referred to as the current method, and the class that the current method belongs to is referred to as the current class.

Figure 4:
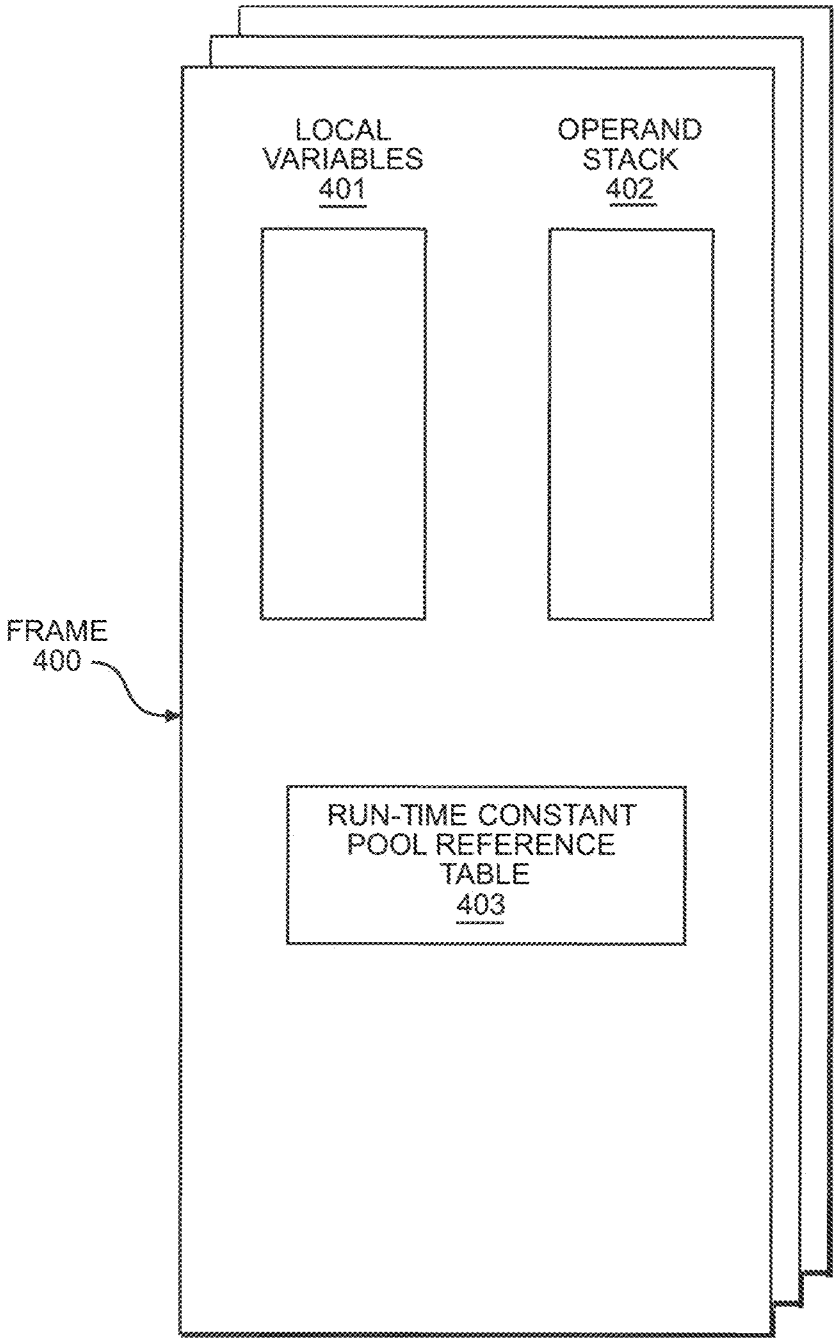
FIG. 4 illustrates an example frame in block diagram form according to an embodiment.

FIG. 4 illustrates an example frame 400 in block diagram form according to an embodiment. In order to provide clear examples, the remaining discussion will assume that frames of virtual machine stack 310 and virtual machine stack 313 adhere to the structure of frame 400.

In an embodiment, frame 400 includes local variables 401, operand stack 402, and run-time constant pool reference table 403. In an embodiment, the local variables 401 are represented as an array of variables that each hold a value, for example, Boolean, byte, char, short, int, float, or reference. Further, some value types, such as longs or doubles, may be represented by more than one entry in the array. The local variables 401 are used to pass parameters on method invocations and store partial results. For example, when generating the frame 400 in response to invoking a method, the parameters may be stored in predefined positions within the local variables 401, such as indexes 1-N corresponding to the first to Nth parameters in the invocation.

In an embodiment, the operand stack 402 is empty by default when the frame 400 is created by the virtual machine 104. The virtual machine 104 then supplies instructions from the method code 305 of the current method to load constants or values from the local variables 401 onto the operand stack 402. Other instructions take operands from the operand stack 402, operate on them, and push the result back onto the operand stack 402. Furthermore, the operand stack 402 is used to prepare parameters to be passed to methods and to receive method results. For example, the parameters of the method being invoked could be pushed onto the operand stack 402 prior to issuing the invocation to the method. The virtual machine 104 then generates a new frame for the method invocation where the operands on the operand stack 402 of the previous frame are popped and loaded into the local variables 401 of the new frame. When the invoked method terminates, the new frame is popped from the virtual machine stack and the return value is pushed onto the operand stack 402 of the previous frame.

In an embodiment, the run-time constant pool reference table 403 contains a reference to the run-time constant pool 304 of the current class. The run-time constant pool reference table 403 is used to support resolution. Resolution is the process whereby symbolic references in the constant pool 304 are translated into concrete memory addresses, loading classes as necessary to resolve as-yet-undefined symbols and translating variable accesses into appropriate offsets into storage structures associated with the run-time location of these variables.

2.4 Loading, Linking, and Initializing

In an embodiment, the virtual machine 104 dynamically loads, links, and initializes classes. Loading is the process of finding a class with a particular name and creating a representation from the associated class file 200 of that class within the memory of the runtime environment 113. For example, creating the run-time constant pool 304, method code 305, and field and method data 306 for the class within the per-class area 303 of the virtual machine memory layout 300. Linking is the process of taking the in-memory representation of the class and combining it with the run-time state of the virtual machine 104 so that the methods of the class can be executed. Initialization is the process of executing the class constructors to set the starting state of the field and method data 306 of the class and/or create class instances on the heap 302 for the initialized class.

The following are examples of loading, linking, and initializing techniques that may be implemented by the virtual machine 104. However, in many embodiments the steps may be interleaved, such that an initial class is loaded, then during linking a second class is loaded to resolve a symbolic reference found in the first class, that in turn causes a third class to be loaded, and so forth. Thus, progress through the stages of loading, linking, and initializing can differ from class to class. Further, some embodiments may delay (perform "lazily") one or more functions of the loading, linking, and initializing process until the class is actually required. For example, resolution of a method reference may be delayed until a virtual machine instruction invoking the method is executed. Thus, the exact timing of when the steps are performed for each class can vary greatly between implementations.

To begin the loading process, the virtual machine 104 starts up by invoking the class loader 107 that loads an initial class. The technique that the initial class is specified will vary from embodiment to embodiment. For example, one technique may have the virtual machine 104 accept a command line argument on startup that specifies the initial class.

To load a class, the class loader 107 parses the class file 200 corresponding to the class and determines whether the class file 200 is well-formed (meets the syntactic expectations of the virtual machine 104). If not, the class loader 107 generates an error. For example, in Java the error might be generated in the form of an exception that is thrown to an exception handler for processing. Otherwise, the class loader 107 generates the in-memory representation of the class by allocating the run-time constant pool 304, method code 305, and field and method data 306 for the class within the per-class area 303.

In some embodiments, when the class loader 107 loads a class, the class loader 107 also recursively loads the superclasses of the loaded class. For example, the virtual machine 104 may ensure that the superclasses of a particular class are loaded, linked, and/or initialized before proceeding with the loading, linking and initializing process for the particular class.

During linking, the virtual machine 104 verifies the class, prepares the class, and performs resolution of the symbolic references defined in the run-time constant pool 304 of the class.

To verify the class, the virtual machine 104 checks whether the in-memory representation of the class is structurally correct. For example, the virtual machine 104 may check that each class except the generic class Object has a superclass, check that final classes have no sub-classes and final methods are not overridden, check whether constant pool entries are consistent with one another, check whether the current class has correct access permissions for classes/fields/structures referenced in the constant pool 304, check that the virtual machine 104 code of methods will not cause unexpected behavior (e.g. making sure a jump instruction does not send the virtual machine 104 beyond the end of the method), and so forth. The exact checks performed during verification are dependent on the implementation of the virtual machine 104. In some cases, verification may cause additional classes to be loaded, but does not necessarily require those classes to also be linked before proceeding. For example, assume Class A contains a reference to a static field of Class B. During verification, the virtual machine 104 may check Class B to ensure that the referenced static field actually exists. Doing so might cause loading of Class B, but not necessarily the linking or initializing of Class B. However, in some embodiments, certain verification checks can be delayed until a later phase, such as being checked during resolution of the symbolic references. For example, some embodiments may delay checking the access permissions for symbolic references until those references are being resolved.

To prepare a class, the virtual machine 104 initializes static fields located within the field and method data 306 for the class to default values. In some cases, setting the static fields to default values may not be the same as running a constructor for the class. For example, the verification process may zero out or set the static fields to values that the constructor would expect those fields to have during initialization.

During resolution, the virtual machine 104 dynamically determines concrete memory address from the symbolic references included in the run-time constant pool 304 of the class. To resolve the symbolic references, the virtual machine 104 utilizes the class loader 107 to load the class identified in the symbolic reference (if not already loaded). Once loaded, the virtual machine 104 has knowledge of the memory location within the per-class area 303 of the referenced class and its fields/methods. The virtual machine 104 then replaces the symbolic references with a reference to the concrete memory location of the referenced class, field, or method. In an embodiment, the virtual machine 104 caches resolutions to be reused in case the same class/name/descriptor is encountered when the virtual machine 104 processes another class. For example, in some cases, class A and class B may invoke the same method of class C. Thus, when resolution is performed for class A, that result can be cached and reused during resolution of the same symbolic reference in class B to reduce overhead.

In some embodiments, the step of resolving the symbolic references during linking is optional. For example, an embodiment may perform the symbolic resolution in a "lazy" fashion, delaying the step of resolution until a virtual machine instruction that requires the referenced class/method/field is executed.

During initialization, the virtual machine 104 executes the constructor of the class to set the starting state of that class. For example, initialization may initialize the field and method data 306 for the class and generate/initialize any class instances on the heap 302 created by the constructor. For example, the class file 200 for a class may specify that a particular method is a constructor that is used for setting up the starting state. Thus, during initialization, the virtual machine 104 executes the instructions of that constructor.

In some embodiments, the virtual machine 104 performs resolution on field and method references by initially checking whether the field/method is defined in the referenced class. Otherwise, the virtual machine 104 recursively searches through the superclasses of the referenced class for the referenced field/method until the field/method is located or the top-level superclass is reached.

2.5. Example Optimized Architecture

Figure 5:
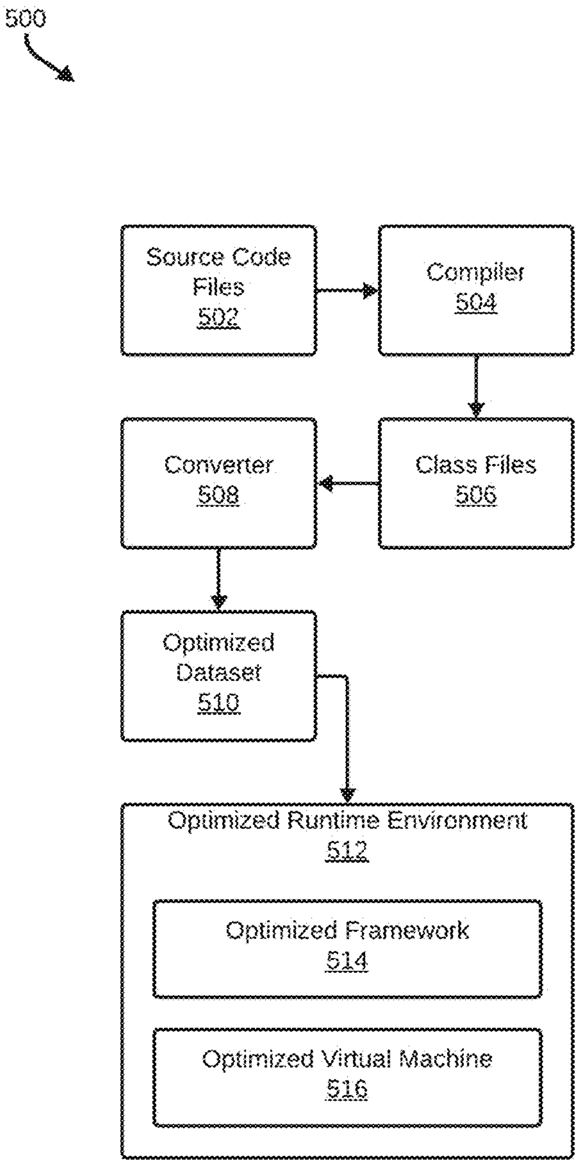
FIG. 5 illustrates an example optimized computing architecture according to an embodiment.

FIG. 5 illustrates an example architecture 500 for optimizing class files in accordance with one or more embodiments. As illustrated in FIG. 5, architecture 500 includes source code files 502, compiler 504, class files 506, converter 508, optimized dataset 510, and optimized runtime environment 512. In one or more embodiments, the architecture 500 may include more or fewer components than the components illustrated in FIG. 5. The components illustrated in FIG. 5 may be local to or remote from each other. The components illustrated in FIG. 5 may be implemented in software and/or hardware. Each component may be distributed over multiple applications and/or machines. Multiple components may be combined into one application and/or machine. Operations described with respect to one component may instead be performed by another component.

In an embodiment, source code files 502 describes an applet, a library, and/or other information. As used herein, an "applet" refers to an application that is designed for a resource-constrained environment, and a "library" refers to a collection of reusable code modules. Source code files 502 may describe multiple applets and/or multiple libraries. The contents of source code files 502 may be organized into a package or multiple packages. A package may include multiple applets and/or libraries. As used herein, an "applet package" refers to a package that includes at least one applet, and a "library package" refers to a package that includes at least one library. A package may simultaneously be an applet package and a library package. Source code files 502 are written in a programming language(s) such as Java, C, C++, C#, Ruby, Perl, and/or another programming language.

In an embodiment, source code files 502 describe software configured for a resource-constrained environment. A smart card or a similar device is an example of a resource-constrained environment. An example smart card includes a microprocessor acting as a CPU and/or persistent memory. The example smart card optionally includes other hardware such as a near-field communication (NFD) device, a power supply, a contact pad, and/or other components. Smart cards often possess an eight-bit or 16-bit computing architecture.

In an embodiment, source code files 502 describe an applet that is designed to leverage the resources of the smart card to perform a specific task. For instance, the applet of source code files 502 may be designed to establish communications with a payment terminal and manage a secure transaction.

In an embodiment, compiler 504 compiles source code files 502 to generate class files 506. Compiler 504 receives source code files 502 as an input and converts source code files 502 into a format that class files 506 are expected to conform with. In an example, source code files 502 are written in the Java programming language, and class files 506 are expected to adhere to a particular class file format that is dictated by the JVM specification.

In an embodiment, class files 506 contain methods, and the methods contain bytecode instructions. The bytecode instructions include operation codes (referred to herein as "opcodes") as well as other information. The bytecodes instructions of class files 506 can be executed by a virtual machine or another device.

In an embodiment, the format of class files 506 is not well suited for a resource-constrained environment. In an example, class files 506 include an applet that is configured for a resource-constrained environment such as a smart card (e.g., a Java Card). In this example, the smart card possesses an eight-bit or 16-bit architecture and limited persistent memory. In contrast, the format of class files 506 conforms with a specification that is designed for a comparatively resource-rich environment that possesses a 32-bit architecture (e.g., the JVM specification).

In an embodiment, converter 508 converts class files 506 to generate optimized dataset 510. As used herein, an "optimized dataset" refers to a dataset that is optimized for a particular computing environment(s). A particular computing environment that a dataset is optimized for may be any computing environment, and it should be understood that the particular computing environment (and the optimizations applied to the dataset) may vary between applications. It should be noted that converter 508 may permanently remove information from class files 506. Consequently, it may not be possible to revert the dataset 510 to class files 506 merely by reversing the operations performed by converter 508.

In an embodiment, optimized dataset 510 is configured for a resource-constrained environment. Converter 508 applies various transformations to class files 506 to optimize the contents of class files 506 for a resource-constrained environment. In an example, class files 506 are Java class files that conform to the JVM specification, and optimized dataset 510 is a converted applet (CAP) file that conforms to a Java Card Virtual Machine (JCVM) specification. The JCVM specification is different that the JVM specification as the JCVM specification is configured to run on smart cards (e.g., a Java card) and similar execution platforms with limited processing and memory resources. A JCVM may operate in a Java Card Runtime Environment (JCRE). The JVM specification and the JCVM specification are provided herein as examples for purposes of clarity and understanding. It should be understood that the format of class files 506 and/or optimized dataset 510 may vary between applications.

In an embodiment, converter 508 alters class files 506 such that certain elements are referenced by numbered tokens rather than Unicode strings. A numbered token includes a number that represents an element (referred to herein as a "token value"). Generally, a numbered token requires less resources to store and process than a Unicode string that the numbered token replaces. As an example, assume that a name of a reference type (e.g., a class or interface) included in class files 506 is the string value "bicycle." Assuming that "bicycle" is expressed in ASCII code points, representing each character of "bicycle" in a UTF-8 format will require a byte. Thus, the representation of "bicycle" in class files 506 occupies at least 7 bytes. Converter 508 replaces the string value "bicycle" with a numbered token. If the token value of the numbered token is an unsigned value between 0 and 256, the token value can be represented in a single byte. In this manner and others, converter 508 may substantially decrease the size of optimized dataset 510 relative to class files 506.

In an embodiment, converter 508 assigns a unique numbered token to each package in the class files 506. For each package of class files 506, converter 508 assigns numbered tokens to reference types (e.g., classes and interfaces), static methods, virtual methods, interface methods, static fields, instance fields, and/or other elements of the package. A numbered token may be a public token or a private token. Public tokens are assigned to externally-visible elements. Examples of externally-visible elements are public reference types, public or protected fields, and public or protected methods. Private tokens are assigned to internally-visible elements. As used herein, a "package token" is a numbered token of a package, a "class token" is a numbered token of a class or interface, a "method token" is a numbered token of a method, and a "field token" is a numbered token of a field.

In an embodiment, converter 508 assigns each package of class files 506 a unique package token. Furthermore, each class or interface in a package is assigned a unique class token, but reference types in different packages may have overlapping class token values. Each method in a reference type is assigned a unique method token, but methods in different reference types may be represented by overlapping token values. Each field in a method is assigned a unique field token, but fields in different reference types may have overlapping token values. It should be noted that occurrences of the same method or field in different reference types may or may not be assigned the same token value. For example, the token value assigned to a method of a given interface is unrelated to the token values of other occurrences of the same method in any superinterface of the given interface. Each interface includes its own token values (starting consecutively from 0) for all methods (inherited or otherwise) included in the interface. Thus, occurrences of the same interface method may be assigned different class tokens, and/or different interface methods may be assigned the same class token.

In an embodiment, converter 508 removes and/or replaces opcodes in the bytecode instructions of a method represented in class files 506. As an example, assume that class files 506 are class files conforming to the JVM specification and that optimized dataset 508 is a CAP file conforming to the JCVM specification. The JCVM specification utilizes a different vocabulary of opcodes than the opcode vocabulary of the JVM specification. The JCVM opcode vocabulary is less extensive than the JVM opcode vocabulary. Many of the opcodes in the JCVM opcode vocabulary are functionally equivalent to opcodes in the JVM opcode vocabulary. However, the JCVM opcode vocabulary also includes opcodes that do not have functional equivalents in the JVM opcode vocabulary. Converter 508 translates the bytecode instructions of class files 506 into JCVM opcodes to generate class files 510. Multiple JVM opcodes may be replaced with a single JCVM opcode that is associated with similar but less robust functionality. If the converter 508 identifies a bytecode instruction in class files 506 that converter 508 cannot express with JCVM opcode vocabulary, converter 508 may terminate the conversion process.

In an embodiment, optimized dataset 510 includes bytecode instructions that are optimized for execution by a virtual machine running on a resource-constrained environment. Additional embodiments and/or examples relating to optimized dataset 510 are described below in Section 2.6, titled "Example Converted Applet File Structure."

In an embodiment, converter 508 generates additional files to accompany optimized dataset 510. In an example, optimized dataset 510 is a CAP file, and converter 508 generates an export file and a Java card assembly (JCA) file to accompany the CAP file. The export file includes entries for externally-visible elements of the CAP file. The export file excludes information regarding internally-visible elements of the CAP file. An example entry in the export file indicates a name of an element and a numbered token of the element. The export file may be included in a Java Archive (JAR) file with the CAP file.

In an embodiment, optimized dataset 510 is executed in an optimized runtime environment 512. As illustrated in FIG. 5, optimized runtime environment 512 includes optimized framework 514 and optimized virtual machine 516. In an example, optimized runtime environment 512 is a JCRE. The JCRE is a subset of the JRE that is specifically tailored for running applets on smartcards or other resource-constrained environments.

In an embodiment, optimized framework 514 defines a set of target reference types and APIs that support software included in optimized dataset 510. In an example, optimized framework 514 is the JCRE framework. The JCRE framework includes JCRE class libraries that are designed to run on a resource-constrained environment. The JCRE class libraries are less extensive than the target JRE class libraries. The JCRE class libraries may be used for building, communicating with, and working with applets included in optimized dataset 510.

In an embodiment, optimized virtual machine 516 runs on a resource-constrained environment such as a smart card, a simulated smart card environment, or another similar platform. Optimized virtual machine 516 executes bytecode instructions of methods included in optimized dataset 510. Optimized virtual machine 516 possesses a single thread structure. The thread structure of optimized virtual machine 516 includes a program counter and a virtual machine stack. Optimized virtual machine 516 can generate a new frame upon a method being invoked. A frame generated by optimized virtual machine 516 includes an operand stack, a local variables array, and a runtime constant pool reference table. Based on bytecode instructions included in a method of optimized dataset 510, optimized virtual machine 516 may manipulate values on the operand stack, move values between the operand stack and local variables, and/or perform other operations. In an example, the optimized virtual machine 516 is a JCVM. In this example, the operand stack is composed of 16-bit slots. Operands that are larger than 16-bits will occupy multiple slots of the operand stack. It should be noted that other operand stacks incorporate larger slots. For instance, an operand stack that is typically manipulated by a JVM is composed of 32-bit slots. Further, in this example, the local variables array indexes local variables that accord to the JVCM specification. The JCVM local variables can each hold a value that is 16-bits or smaller. A value that is larger than 16-bits will occupy multiple local variables, and, therefore, is represented by multiple indices in the local variables array. Thus, a bytecode instruction of optimized dataset 510 that stores, loads, substitutes and/or otherwise manipulates a value stored to local variables that is larger than 16-bits may need to reference multiple indices in the local variables array. It should be further noted that local variables associated with other configurations can hold larger values. For instance, a single local variable that is typically associated with a JVM can hold a value that is 32-bits or smaller. Because the JCVM local variables are smaller than the JVM local variables, bytecode instructions for a JCVM may need reference multiple indices where equivalent bytecode instructions for a JVM would only need to reference fewer indices.

2.6. Example Converted Applet File Structure

Figure 6:
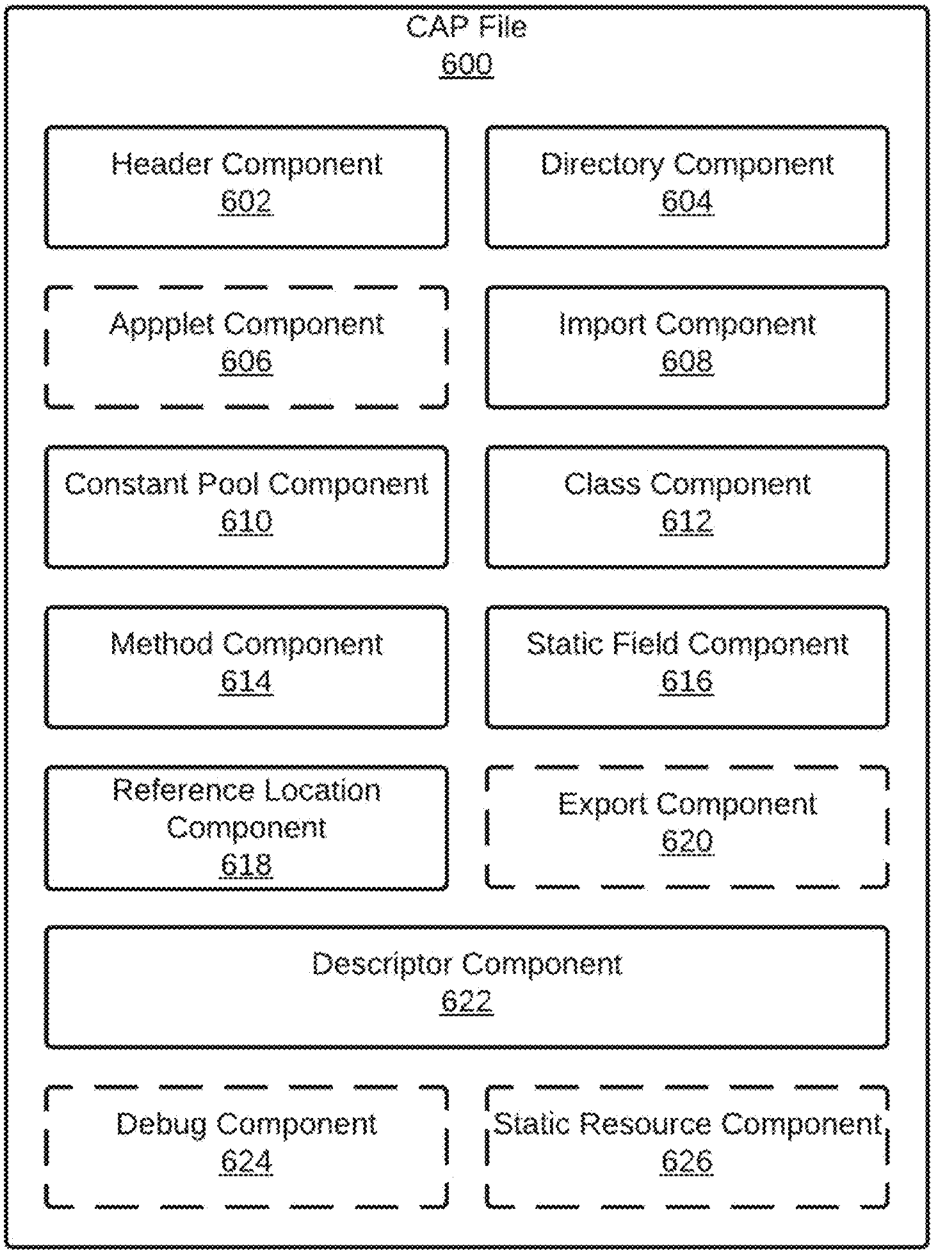
FIG. 6 illustrates an example structure for a converted applet file in block diagram form according to an embodiment.

FIG. 6 illustrates an example structure for a CAP file 600 in block diagram according to an embodiment. In order to provide clear examples, the remainder of Section 2 assumes that the optimized dataset 510 of the computing architecture 500 adheres to the structure of the example CAP file 600 described in this section. However, in a practical environment, the structure of the optimized dataset will be dependent on the implementation of the optimized virtual machine 516. Further, one or more features discussed herein may modify the structure of the CAP file 600 to, for example, add additional structure types. Therefore, the exact structure of the CAP file 600 is not critical to the techniques described herein.

In an embodiment, CAP file 600 includes a package or multiple packages. An example package that may be included in CAP file 600 contains an applet(s) and/or a library(s). It should be noted that a CAP file (i.e., a converted applet file) need not contain an applet. A JAR file format is used as the container format for CAP file 600. An export file that is associated with CAP file 600 may be included in a JAR file with CAP file 600.

In an embodiment, CAP file 600 includes a set of components that describe or otherwise characterize the contents of CAP file 600. As illustrated in FIG. 6, CAP file 600 may include a header component 602, a directory component 604, an applet component 606, an import component 608, a constant pool component 610, a class component 612, a method component 614, a static field component 616, a reference location component 618, an export component 620, a descriptor component 622, a debug component 624, and/or a static resource component 626. Additionally, or alternatively, CAP file 600 includes custom components. Some components of CAP file 600 may be optional components.

In an embodiment, header component 602 includes general information about CAP file 600 and the package or set of packages described by CAP file 600. Among other information, the header component 602 indicates if CAP file 600 is a compact CAP file or an extended CAP file. A compact CAP may hold a single package. An extended CAP file may hold a set of one or more packages.

In an embodiment, directory component 604 lists the size of each component included in CAP file 600. If an optional component is not included in CAP file 600, the directory component 604 lists the size of the optional component as zero.

In an embodiment, applet component 606 includes an entry for each applet defined in CAP file 600. Applets are defined by implementing a non-abstract subclass, direct or indirect, of a Java Card framework applet API class. Applet component 606 is an optional component of CAP file 600. If no applets are included in CAP file 600, applet component 606 is absent from CAP file 600.

In an embodiment, import component 608 lists a set of packages imported by the reference types in CAP file 600. Import component 608 does not include entries for packages defined in CAP file 600.

In an embodiment, constant pool component 610 contains an entry for each of the reference types, methods, and fields referenced by elements in the method component 614. The constant pool component 610 includes may include entries for class and interfaces references, instance field references, virtual method references, static field references, static method references, and/or other types of references. An example entry in constant pool component 610 references a class, interface, method, or field using a package token, a class token, a method token, and/or a field token.

In an embodiment, class component 612 describes each of the classes and interfaces described in CAP file 600. Class component 612 does not include complete access information and content details for each class and interface. Rather, class component 612 is limited to the information that is used to execute operations associated with a particular reference type without performing verification. Additional information regarding classes and interface is included in descriptor component 622. Among other information, class component 612 includes a classes array and an interfaces array. The classes array identifies each class of CAP file 600. The classes in the classes array are indexed based on hierarchy. For example, a class possesses a lower index than any subclasses of the class. The interfaces array identifies each interface of CAP file 600. The interfaces in the interface array are organized based on hierarchy. For example, an interface possesses a lower index than any subinterfaces of the interface. For each interface of CAP file 600, class component 612 includes an array of all superinterfaces of the interface. Both direct and indirect superinterfaces are included in the array. For each class of CAP file 600, class component 612 identifies any superclasses of the class, any interfaces directly implemented by the class, and any superinterfaces of interfaces directly implemented by the class.

The class component 612 includes an information structure for each class and interface. An information structure of a reference type (e.g., a class or interface) includes a methods table. The methods table includes entries for methods declared in the reference type. In addition a methods table may include entries for methods that are inherited by the reference type.

In an embodiment, method component 614 describes methods of CAP file 600. Method component 614 excludes interface methods; however, method component 614 does include abstract methods that are declared in abstract classes.

In an embodiment, static field component 616 contains information that can be used to create and initialize an image of the static fields defined in CAP file 600.

In an embodiment, reference location component 618 contains lists of positions that point to specific information within the method component 614 and constant pool component 610.

In an embodiment, export component 620 lists all of the static elements in CAP file 620 that may be imported by other reference types of other packages. Export component 620 is an optional component of CAP file 600.

In an embodiment, descriptor component 622 includes information that can be used to parse and verify all elements of CAP file 600. Descriptor component 622 references (and therefore describes) elements identified in the constant pool component 610, class component 612, method component 614, and static field component 616. Descriptor component 622 provides detailed information regarding packages, types, methods, fields, and other elements of CAP file 600. Descriptor component 622 describes both public and private elements of CAP file 600. Among other information, descriptor component 622 provides the token values of reference types, methods, fields, and/or other elements of CAP file 600. In addition, descriptor component 622 identifies, for each reference type, an array of interfaces implemented by the reference type, an array of fields declared by the reference type, an array of methods declared and/or defined by the reference type, and/or other information. An array of methods for a class does not include methods inherited by the class. An array of methods for an interface does include methods inherited by the interface.

In an embodiment, debug component 624 includes all of the metadata that is necessary for debugging packages included in CAP file 620 in a suitably instrumented JCVM. Debug component 624 is an optional component of CAP file 600.

In an embodiment, static resource component 626 includes any static resource of CAP file 600 that can be represented in a byte format. Static resource component 620 is an optional component of CAP file 600. If any package of CAP file 620 includes a static resource, CAP files 600 includes static resource component 626.

3. Naming Elements of an Optimized Dataset

Figure 7:
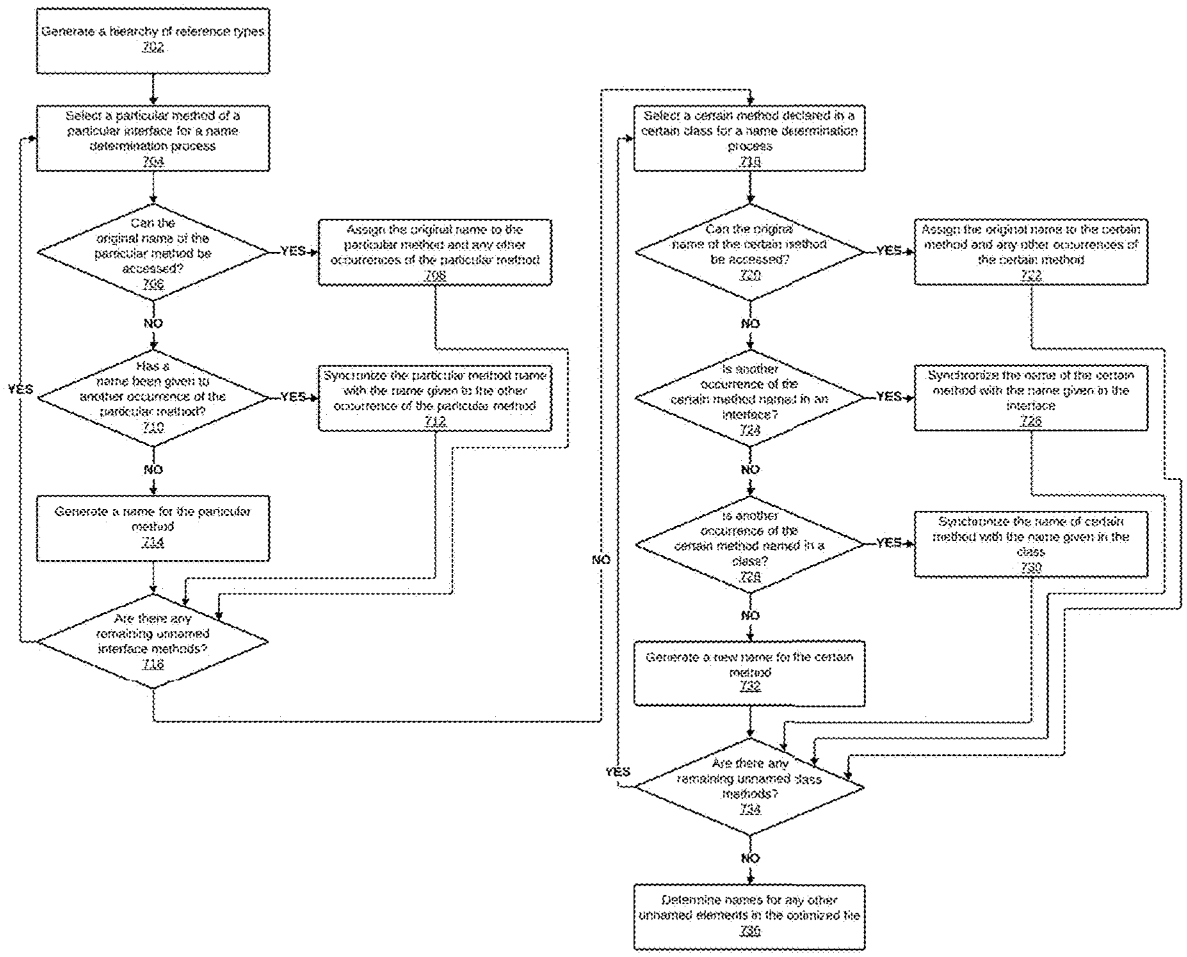
FIG. 7 illustrates an example set of operations for naming elements of an optimized dataset according to an embodiment.

FIG. 7 illustrates an example set of operations for naming elements of an optimized dataset in accordance with one or more embodiments. One or more operations illustrated in FIG. 7 may be modified, rearranged, or omitted all together. Accordingly, the particular sequence of operations illustrated in FIG. 7 should not be construed as limiting the scope of one or more embodiments.

In an embodiment, the system accesses information included in an optimized dataset to determine a hierarchy of the reference types that are included in the optimized dataset (Operation 702). In an example, the optimized dataset is a CAP file, and the system determines the hierarchy of reference types based on information that the system obtains from a descriptor component, a class component, a method component, a constant pool component, a static field component, and/or other components of the CAP file. Additionally, or alternatively, hierarchical information regarding reference types of the CAP file may be obtained from an export file that accompanies the CAP file. If the CAP file is an extended CAP file, the system determines a separate hierarchy of reference types for each package included in the CAP file or the system determines a single hierarchy of reference types for all packages of a CAP file.

The hierarchy of reference types defines abstract relationships between reference types included in the optimized dataset. An abstract relationship defined by the hierarchy of reference types may be direct or indirect. The hierarchy of reference types may detail how methods are directly or indirectly inherited, implemented, and/or are overridden. In example, the hierarchy of reference types defines abstract relationships between as classes and/or interfaces. A superclass or superinterface is higher in the hierarchy than a corresponding subclass or subinterface. A class that implements an interface is lower in the hierarchy than the interface.

As discussed above, different methods in different reference types may be represented by the same method token (i.e., the different methods are assigned the same token value). Furthermore, occurrences of the same method may be represented by different methods tokens. For example, a method declared in a superinterface may be represented by a different method token than another occurrence of the method in a subinterface (i.e., an inherited method). In view of the foregoing, the system may not be able to determine if two or more methods are occurrences of the same method based on numbered tokens alone. However, determining the hierarchy of reference types in the optimized dataset may enable the system to identify occurrences of the same method. Occurrences of the same method are found in reference types that are abstractly related (directly or indirectly). In an example, a method declared in a class or interface and an inherited method in a corresponding subclass or subinterface (direct or indirect) are occurrences of the same method. In another example, an abstract method in an interface and a method defined in a reference type that (directly or indirectly) implements the interface are occurrences of the same method.

The system optionally generates a data structure that represents the hierarchy of reference types. The data structure may be represented by a visualization (e.g., a graph, a diagram, a chart, a table, a picture, etc.). The system may subsequently populate the data structure with additional information that is used to process the optimized dataset. For instance, as the system determines names for reference types, methods, fields and/or other elements of the optimized dataset, the system may populate the names to the data structure. The names assigned to the elements in the data structure are used to replace the numbered tokens that represent the elements when the system converts the optimized dataset (e.g., a CAP file) to a target format (e.g., a Java class file format).

Additional embodiments and/or examples relating to a hierarchy of reference types are included below in Section 5.1, titled "Example Reference Type Hierarchy."

In an embodiment, the system selects a particular method declared in a particular interface for a name determination process (Operation 704). In general, the system selects interface methods for the name determination process in an order that corresponds to the hierarchy of reference types. For instance, the system may select a method declared in a superinterface for the name determination process prior to selecting a method declared in a corresponding subinterface. However, it should be noted that in the process of determining a name for a method declared in a reference type, the system may also determine a name for another occurrence of the method. For instance, in the process of determining a name for a virtual default method defined in a superinterface, the system may also determine the name for a method defined in a subinterface (e.g., a method that overrides the virtual default method). Thus, a name of a method declared in an interface that is lower in the hierarchy of reference types may be determined before a name of a method declared in an interface that is higher in the hierarchy of reference types. In an example, the optimized dataset is a CAP file, and a descriptor component, a class component, and/or another component of the CAP file includes an index of the interfaces included in the CAP file. The interfaces are indexed according to hierarchy such that a superinterface will have a lower index value than a corresponding subinterface. The system selects interface methods for the name determination process in an order that corresponds to the index of interfaces. For instance, the first interface method selected may be declared and/or defined in the interface having the lowest index value. In this example, the system may determine names for all of the methods in an interface having a low value before selecting, for the name determination process, a method declared in an interface having a higher index value.

In an embodiment, the system determines if an original name of the particular method can be accessed and proceeds to another operation based on the determination (Operation 706). If the original name of the particular method is found (YES in Operation 706), the system proceeds to Operation 708. Alternatively, if the original name of the interface method is not found (NO in Operation 708), the system proceeds to Operation 710. If the optimized dataset is a CAP file, an original name of the particular interface may be found in an export file that was generated with the CAP file. In general, an export file contains original names of externally-visible elements of a corresponding CAP file. Thus, the export file may contain the original name of the particular method if the particular method is an externally-visible method. However, it should be noted that in some applications the system may not have access to an export file that corresponds to a CAP file.

In an embodiment, the system assigns the original name to the particular method and other occurrences of the particular method (Operation 708). The system identifies any other occurrences of the particular method based on the hierarchy of reference types. Other occurrences of the particular method may be found in reference types that bear a direct or indirect abstract relationship to the particular interface. As an example, assume that the particular method is an abstract method, and that the hierarchy of reference types indicates that the particular interface is implemented by a class. Further assume that the class defines a concrete method. In this example, the system may infer that the concrete method is intended to provide implementation to the particular method. Therefore, the system assigns the original name to the particular method and the concrete method. It should be noted that if the system does not assign the same name to occurrences of the same method, converting the optimized dataset to a target format may result in a loss of functionality. Further consider the example described above. If the system assigns the particular method and the concrete method different names, then the concrete method no longer provides implementation for the abstract method and the class becomes an abstract class as a result. If, for instance, some other software module is configured to use the interface to call for the execution of the method body defined in the concrete method, a failure may ensue at runtime.

In an embodiment, the system determines if any other occurrences of the particular method have already been assigned a name and proceeds to another operation based on the determination (Operation 710). If another occurrence of the particular method has been assigned a name (YES in Operation 710), the system proceeds to Operation 712. If no other occurrences of the particular method have been assigned a name (NO in Operation 710), the system proceeds to Operation 714.

In an embodiment, the system names the particular method after another occurrence of the particular method (Operation 712). In an example, the other occurrence of the particular method is declared in a superinterface of the particular interface. In this example, the name of the other occurrence of the particular method was previously generated by the system.

In an embodiment, the system generates a new name for the particular method (Operation 714). The system generates a new name for the particular method based on a predefined convention for naming methods. In an example, the naming convention for methods is based on the numbered tokens that represent the methods in the optimized dataset. An example method name that may be generated by the system according to the example naming convention is "method_token0_descoff10."

In an embodiment, the system determines if there are any remaining unnamed methods that are declared in an interface of the optimized dataset and proceeds to another operation based on the determination (Operation 716). If a method declared in an interface remains unnamed (YES in Operation 716), the system returns to Operation 702. Alternatively, if each interface method of the optimized dataset has been given a name (NO in Operation 716), the system proceeds to Operation 718.

In an embodiment, the system selects a certain method declared in a certain class for a name determination process (Operation 718). In general, the system selects class methods for a name determination process in an order that corresponds to the hierarchy of the classes. For instance, the system may select a method declared in a superclass for the name determination process prior to selecting a method declared in a corresponding subclass for the name determination process. However, it should be noted that in the process of determining a name for a method declared in a class, the system may also determine a name for another occurrence of the method (e.g., another occurrence of the method in a subclass). Thus, a method declared in a class that is lower in the hierarchy of reference types may be determined before a method that is declared in a class that is higher in the hierarchy of reference types. In an example, the optimized dataset is a CAP file, and a descriptor component, a class component, and/or another component of the CAP file includes an index of classes included in the CAP file. The classes are indexed according to hierarchy such that a superclass will have a lower index value than a subclass. The system selects interface methods for the name determination process in an order that corresponds to the index of the classes. For instance, the system may determine names for all of the methods in the class with the lowest index value prior to selecting a method declared in another method for the name determination process.

In an embodiment, the system determines if the original name of the certain method can be accessed, and proceeds to another operation based on the determination (Operation 720). If the original name of the certain method is found (YES in Operation 720), the system proceeds to Operation 722. If the original name of the certain method is not found (NO in Operation 720), the system proceeds to Operation 724. If the optimized dataset is a CAP file, and if the system has access to an export file that corresponds to the CAP file, an original name of the certain method may be found in the export file if the certain method is an externally-visible method.

In an embodiment, the system applies the original name to the certain method and any other occurrence of the certain method in the optimized dataset (Operation 722). The system identifies other occurrences of the certain method based on the hierarchy of reference types. Other occurrences of the particular method may be found in reference types that bear a direct or indirect abstract relationships to the certain class. For instance, another occurrence of the certain method may be found in a subclass of the class or an interface that is directly or indirectly implemented by the class. In an example, the system identifies another occurrence of the certain method in subclass of the certain class. The occurrence of the certain method in the subclass is an inherited method. Furthermore, the system identifies yet another occurrence of the certain method in an interface that is implemented by the subclass. The occurrence of the certain method in the interface is an abstract method (i.e., the certain method indirectly implements the interface). In this example, the system assigns the original name to the certain method, the inherited method, and the abstract method. The system previously generated a name for the abstract method (e.g., in an occurrence of operation 714); however, the original name supersedes the name generated by the system.

In an embodiment, the system determines if any other occurrences of the certain method that are declared in an interface have been assigned a name and proceeds to another operation based on the determination (Operation 724). If the system determines that another occurrence of the certain method that is declared in an interface has been named (YES in Operation 724), the system proceeds to Operation 726. Alternatively, if the system determines that no occurrence of the certain method that is declared in an interface has been given a name (NO in Operation 724), the system proceeds to Operation 728.

In an embodiment, the system names the certain method after another occurrence of the certain method that is declared in an interface (Operation 726). The system gives priority to names given to interface methods over names given to class methods.

In an embodiment, the system determines if another occurrence of the certain method that is declared in a class has been assigned a name and proceeds to another operation based on the determination (Operation 728). If the system determines that another occurrence of the certain method has been named (YES in Operation 728), the system proceeds to Operation 730. Alternatively, if the system determines that another occurrence of the certain method has not been named (NO in Operation 728), the system proceeds to Operation 732.

In an embodiment, the system names the certain method after another occurrence of the method that is declared in a class (Operation 730).

In an embodiment, the system generates a new name for the certain method (Operation 732). The system generates a new name for the particular method based on a predefined convention for naming methods. In an example, the naming convention for methods is based on the numbered tokens that represent the methods in the optimized dataset.

In an embodiment, the system determines if any methods declared in a class remain unnamed and proceeds to another operation based on the determination (Operation 734). If the system determines that there are unnamed methods remaining (YES in Operation 734), the system returns to Operation 718. Alternatively, if the system determines that all of the methods declared in the reference types represented in the hierarchy of reference types have been named (NO in Operation 734), the system proceeds to Operation 736.

In an embodiment, the system determines names for other unnamed elements in the optimized dataset (Operation 736). In an example, the optimized dataset is a CAP file, and the system determines names for each package, reference type, field, and/or other element that is represented by a numbered token rather than a name. The system assigns a unique name to each package in the CAP file, each reference type in a package, and each field in a method. If an original name of an element can be found in an export file, the system applies the original name. If an original name of an element cannot be found, the system generates a new name for the element. If there are multiple occurrences of an element (e.g., a field), the system applies the same name to each occurrence of the element. The system may infer that two or more fields are occurrences of the same field, based on the two or more fields being respectively included in two or more occurrences of the same method.

4. Translating Bytecode Instructions

Figure 8:
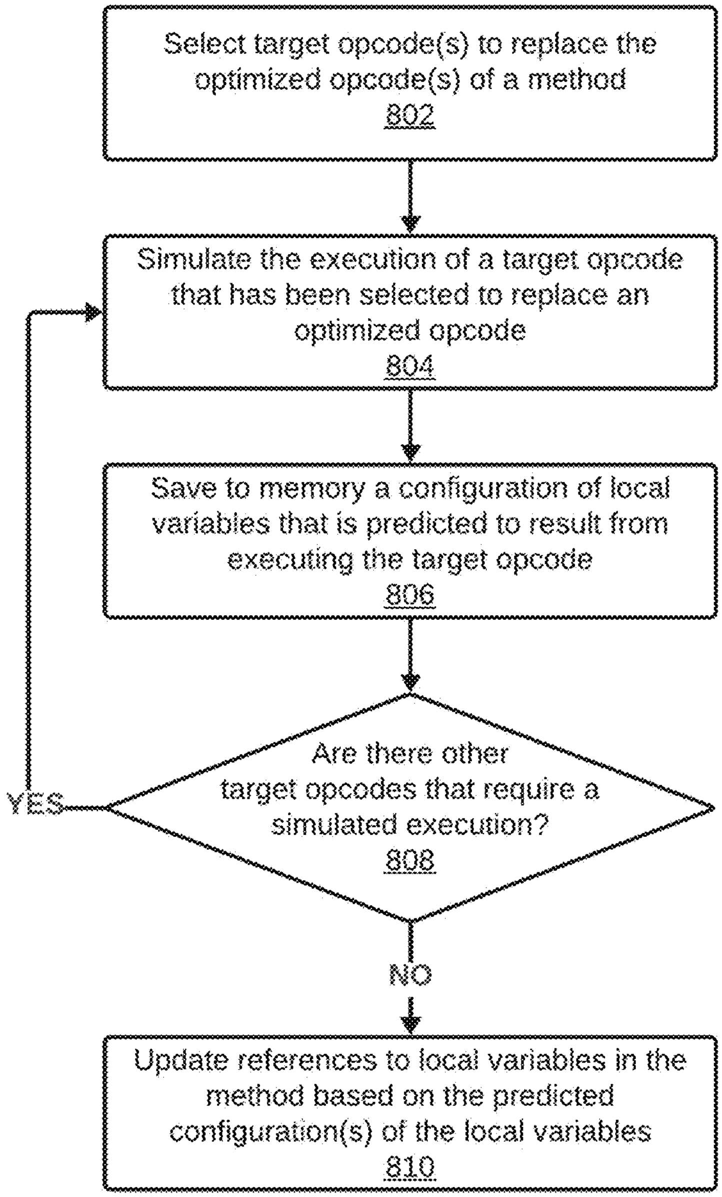
FIG. 8 illustrates an example set of operations for translating bytecode instructions according to an embodiment.

FIG. 8 illustrates an example set of operations for translating the bytecode instructions of a method from an optimized format to a target format. One or more operations illustrated in FIG. 8 may be modified, rearranged, or omitted all together. Accordingly, the particular sequence of operations illustrated in FIG. 8 should not be construed as limiting the scope of one or more embodiments.

In an embodiment, the system selects target opcode(s) to replace the optimized opcode(s) of a method (Operation 802). The target opcode(s) are selected from a target opcode vocabulary. If there is a target opcode that is functionally equivalent to an optimized opcode in the method, the system replaces the optimized opcode with the functionally-equivalent target opcode. However, the method may include an optimized opcode that does not have a functional equivalent in the target opcode vocabulary. If the method includes an optimized opcode that does not have a functional equivalent in the target opcode vocabulary, the system determines a set of non-equivalent target opcode(s) that achieve the same result as the optimized opcode. A set of non-equivalent target opcode(s) that achieve the same result as an optimized opcode may vary based on the manner that the optimized opcode is applied in the method. In some cases, a set of non-equivalent target opcode(s) that replaces an optimized opcode is a single target opcode. The single target opcode is similar to the optimized opcode and happens to achieve the same result as the optimized opcode in the specific context that the optimized opcode is being applied. However, in other cases, a set of target opcode(s) that replaces an optimized opcode includes multiple target opcodes that in combination achieve the same result as the optimized opcode. In an example, the optimized format is a JCVM specification, and the target format is a JVM specification. Thus, the optimized opcodes are JCVM opcodes, and the target opcodes are JVM opcodes. As discussed above, the JVM opcode vocabulary is larger than the JCVM opcode vocabulary, and many JCVM opcodes have equivalents in the JVM opcode vocabulary. However, some JCVM opcodes (e.g., the JCVM opcodes that are tailored for a resource-constrained environment) do not have equivalents in the JVM opcode vocabulary. Consequently, a JCVM opcode in the method may need to be replaced with a similar (but non-equivalent) JVM opcode or multiple non-equivalent JVM opcodes that cumulatively achieve the same result as the JCVM opcode.

Additional embodiments and/or examples relating to replacing an optimized opcode with a set of target opcode(s) are included below in Section 5.2, titled "Example Opcode Substitution."

In an embodiment, the system simulates the execution of a target opcode that has been selected to replace an optimized opcode (Operation 804). The system simulates the execution of the target opcode to generate a predicted configuration of local variables following the execution of the target opcode. The system generates the predicted configuration of local variables to determine if the target opcode affects the configuration of local variables differently than the optimized opcode. The target opcode may affect the configuration of local variables differently than the optimized opcode, because the local variables that are associated with the target format can hold larger values than the local variables that are associated with the optimized format. For instance, an optimized opcode may store a value in multiple local variables where an equivalent target opcode would store the same value in fewer local variables. As an example, assume that the optimized format is a JCVM specification, and the target format is a JVM specification. A local variable that is typically associated with a JCVM can hold a value that is 16 bits or smaller. In contrast, a local variable that is typically associated with a JVM can hold a value that is 32 bits or smaller. Further assume that the optimized opcode and the target opcode both cause a 32-bit value to be stored to local variable(s). In this example, the 32-bit value would be represented by two indices in a local variables array following the execution of the optimized opcode. In comparison, the same 32-bit value would be represented by a single index in a local variables array following the execution of the target opcode.

If the target opcode affects the configuration of local variables differently than the optimized opcode, a subsequent reference to a local variable in the method (i.e., a subsequent reference to a local variable the bytecode instruction of the method) may need to be altered to preserve intended functionality of the method. Further consider the example above and assume that a subsequent opcode is intended to store another value to local variable(s). For the method to function as intended, the 32-bit value and the other value need to be consecutively indexed in a local variables array. To store the other value to local variable(s), the subsequent opcode needs to reference an index of the local variables array. If the 32-bit value is stored to two JCVM local variables that are represented by the first and second index of a local variables array, the subsequent opcode will need to reference the third index of the local variables array. In comparison, if the 32-bit value is stored in a single JVM local variable that is represented by the first index of a local variables array, the subsequent opcode will need to reference the second index of the local variables array. Thus, to preserve the intended functionality of the method, the system may need to alter the reference to the local variables array such that it references the second index rather than the third index. It should be noted that there may be many subsequent references to local variables in the method.

The impact of any given opcode on a configuration of local variables is cumulative with the impact of other opcodes in the method that affect the configuration of local variables. Thus, if the optimized opcode is not the first opcode of the method, the system may generate the predicted configuration of local variables following the execution of the target opcode based on a configuration of local variables that is predicted to precede the execution of the target opcode.

In an embodiment, the system saves to memory the predicted configuration of the local variables following the execution of the target opcode (Operation 806). The predicted configuration of the local variables is saved to memory with a program counter value that corresponds to the target opcode's position within the method. The predicted configuration of local variables may be retrieved from memory and used as a basis for predicting another configuration of local variables following the execution of another target opcode that subsequently appears in the method. Additionally, or alternatively, the predicted configuration may be retrieved from memory and used to determine an appropriate adjustment to a local variable reference that appears in the method after the target opcode.

In an embodiment, the system determines if the execution of any other target opcodes in the method should be simulated and proceeds to another operation based on the determination (Operation 808). If the method contains additional target opcodes that require a simulated execution (YES in Operation 808), the system returns to Operation 804. Alternatively, if the method contains no additional target opcodes that require a simulated execution (NO in Operation 808), the system proceeds to Operation 810. Generally, a target opcode should be simulated if the target opcode may alter the configuration of local variables and/or if method contains references to local variables that occur after the target opcode. In an example, each opcode of the method is simulated.

In an embodiment, the system alters references to local variables in the method (Operation 810). The system alters references to local variables to compensate for target opcode (s) affecting the configuration of local variables differently than optimized opcode(s) that are being replaced. If a target opcode impacts a configuration of local variables differently than an optimized opcode that the target opcode replaces, it may be that each reference to a local variable in the method that occurs after the target opcode needs to be altered. Moreover, there may be multiple target opcodes in the method that affect the configuration of local variables differently than optimized opcodes that are being replaced. Consequently, a reference to a local variable that occurs earlier in the method may need to be altered by a different amount than a reference to a local variable that occurs later in the method. As an example, assume that the target format corresponds to a JVM specification, and the optimized format corresponds to a JCVM specification. Further assume that the method includes three JCVM opcodes that are intended to store three values in consecutive local variables: JCVM opcode A, JCVM opcode B, and JCVM opcode C. JCVM opcode A stores a 32-bit value to local variables by referencing index one. Executing JCVM opcode A results in the 32-bit value being stored to the local variables of index one and index two. JCVM opcode B stores another 32-bit value to local variables by referencing index three. Executing JCVM opcode B results in the other 32-bit value being stored to the local variables of index three and index four. JCVM opcode C stores a 16-bit value to a local variable by referencing index five. Executing JCVM opcode C results in the 16-bit value being stored to the local variable of index five. Each of JCVM opcode A, JCVM opcode B, and JCVM opcode C is replaced by a functionally-equivalent JVM opcode: JVM opcode A, JVM opcode B, and JVM opcode C. If no local variable reference in the method is altered, executing all three JVM opcodes results in the 32-bit value being stored to the local variable of index one, the other 32-bit value being stored to the local variable of index three, and the 16-bit value being stored to the local variable of index five. In this scenario, the local variables of index two and index four remain unoccupied. To preserve the intended functionality of the method, the references to the local variables by JVM opcode B and JVM opcode C will both need to be altered by differing amounts. JVM opcode B will need to reference index two rather than index three. In contrast, JVM opcode C will need to reference index three rather than index five.

The system determines appropriate alterations to local variable references in the method based on predicted configurations of local variables that the system previously saved to memory. For instance, the system determines an appropriate alteration for a given local variable reference in the method based on a predicted configuration of local variables that most recently precedes the occurrence of the given local variable reference in the method. The system retrieves predicted configurations of local variables based on program counter values that correspond to opcodes and/or local variable references. Further consider the example above, and further assume that JVM opcode A, JVM opcode B, and JVM opcode C appear in succession within the method. To determine an appropriate change to the local variable that is referenced by JVM opcode B, the system retrieves a configuration of local variables that is predicted to result from executing JVM opcode A. Based on the predicted configuration of local variables following JVM opcode A, the system alters the bytecode instructions of the method such that JVM opcode B references index two rather than index three. Furthermore, to determine an appropriate change to the local variable that is referenced by JVM opcode C, the system retrieves another configuration of local variables that is predicted to result from executing JVM opcode B. Based on the predicted configuration of local variables following JVM opcode B, the system alters the bytecode instructions of the method such that JVM opcode C references index three rather than index five.

5. Example Embodiment

Detailed examples are described below for purposes of clarity. Any components and/or operations described below should be understood as one specific example that may not be applicable to certain embodiments. Accordingly, components and/or operations described below should not be construed as limiting the scope of any of the claims.

5.1 Example Reference Type Hierarchy

Figure 9:
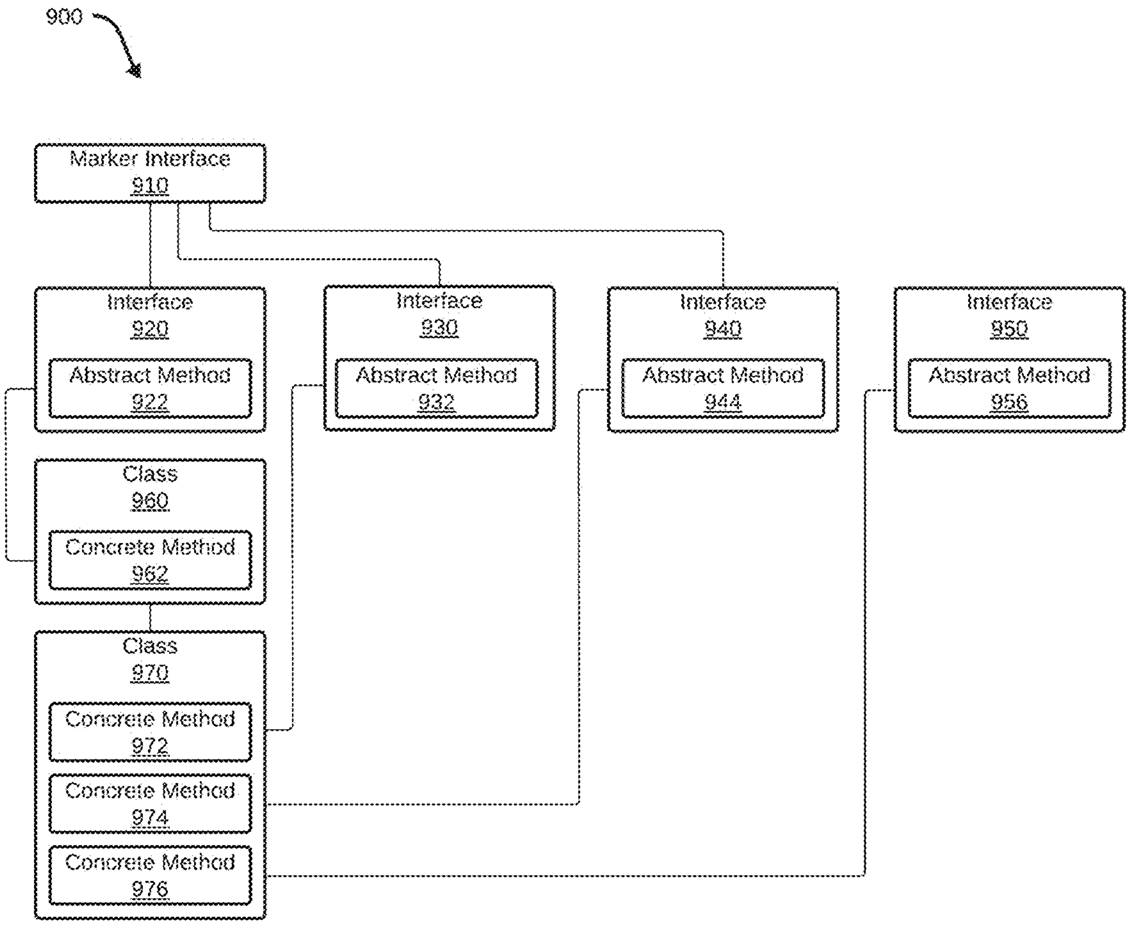
FIG. 9 illustrates an example reference type hierarchy according to an embodiment.

FIG. 9 illustrates an example reference type hierarchy 900 in accordance with one or more embodiments. The reference type hierarchy 900 is provided for purposes of clarity and understanding, and it should be understood that the exact structure and components of reference type hierarchy 900 is not critical to the techniques described herein.

In an embodiment, marker interface 910 is a public interface that declares no methods. An interface that directly or indirectly extends marker interface 910 may be a remote interface. Marker interface is the direct superinterface of interface 920, interface 930, and interface 940.

In an embodiment, interface 920 extends marker interface 910. Interface 920 may be a remote interface. Interface 920 declares abstract method 922. Interface 920 is directly implemented by class 960.

In an embodiment, interface 930 extends marker interface 910. Interface 930 may be a remote interface. Interface 930 declares abstract method 932. Interface 930 is directly implemented by class 970. Interface 930 is indirectly implemented by class 960.

In an embodiment, interface 940 extends marker interface 910 and may be a remote interface. Interface 940 declares abstract method 944. Interface 940 is directly implemented by class 970.

In an embodiment, interface 950 is a private interface. Interface 950 declares abstract method 956. Interface 950 is directly implemented by class 970.

In an embodiment, class 960 directly implements interface 920. Class 960 defines concrete method 962, and the method body of concrete method 962 is the implementation that class 960 provides for abstract method 922. Class 960 indirectly implements interface 930. The method body of concrete method 962 is also the implementation that is indirectly provided to abstract method 932. Class 960 is the direct superclass of class 970.

In an embodiment, class 970 directly extends class 960. Class 970 inherits concrete method 972 from class 970. Class 970 defines concrete method 974 and concrete method 976. Class 970 directly implements interface 930, interface 940, and interface 950. The method body of concrete method 974 is the implementation that is provided to abstract method 944. The method body of concrete method 976 is the implementation that is provided to abstract method 956.

In an embodiment, the system assigns the same method name to abstract method 922, abstract method 932, concrete method 962, and concrete method 972 based on reference type hierarchy 900. If an original name of abstract method 922, abstract method 932, concrete method 962, or concrete method 972 is found in an export file, the system applies the original name to all four methods. Alternatively, a method name that the system generates for abstract method 922 or abstract method 932 is applied to all four methods.

In an embodiment, abstract method 944 and concrete method 974 are assigned the same method number in an optimized dataset. The system assigns the same method name to abstract method 944 and concrete method 974 based on reference type hierarchy 900. If an original name of abstract method 944 or concrete method 974 is found in an export file, the system applies the original to both methods. Alternatively, a method name that the system generates for abstract method 944 is applied to both methods.

In an embodiment, the system assigns the same name to concrete method 956 and abstract method 976 based on reference type hierarchy 900. If an original name of concrete method 956 or abstract method 976 is found in an export file, the system applies the original name to both methods. Alternatively, a method name that the system generates for abstract method 956 is applied to both methods.

5.2 Example Opcode Substitution

Figure 10:
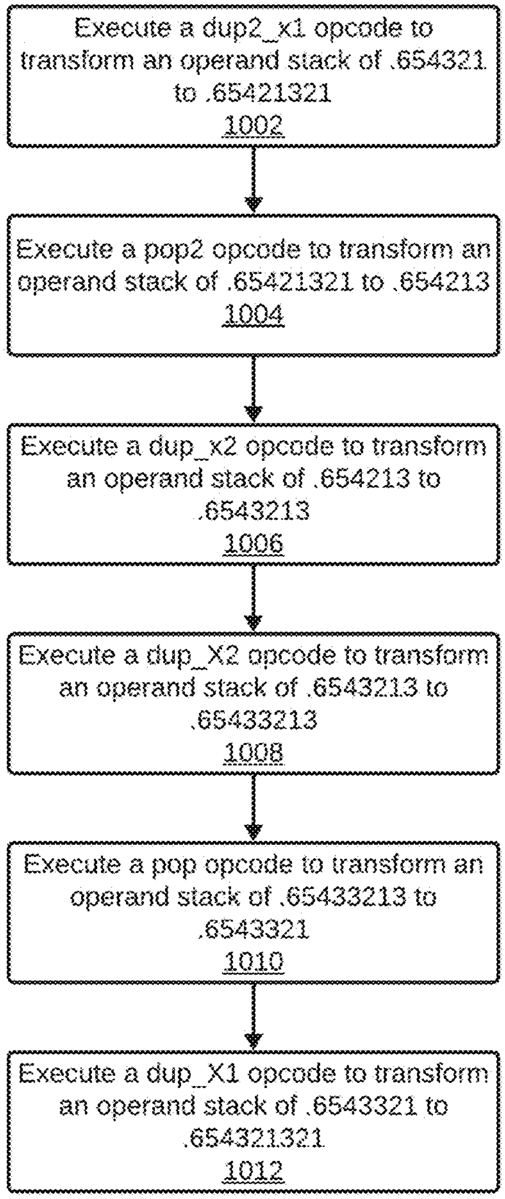
FIG. 10 illustrates an example opcode substitution according to an embodiment.

FIG. 10 is a flowchart that illustrates a set of target opcodes that replicate the functionality of an optimized opcode in accordance with one or more embodiments. One or more operations illustrated in FIG. 10 may be modified, rearranged, or omitted all together. Accordingly, the particular sequence of operations illustrated in FIG. 10 should not be construed as limiting the scope of one or more embodiments.

In an embodiment, the bytecode instructions of a method in a CAP file include the JCVM opcode dup_x mn. The dup_x mn opcode has no functional equivalent in the JVM opcode vocabulary. Thus, the system selects a set of non-equivalent JVM opcode(s) to replicate the same result as the dup_x mn opcode. The JVM opcodes that are included in the set will depend on the value of m, the value of n, and the configuration of the operand stack at the point in the method that the dup_x mn opcode is to be executed. As an example, the remainder of this section 5.2 assumes that the value of m is three, and that the value of n is three. In this example application, the dup_x mn opcode may be represented as dup_x 51 (0x33) where 51 is the decimal representation of mn, and (0x33) is the hexadecimal representation of mn. Executing the dup_x 51 command by a JCVM will cause the top 3 words on the operand stack to be duplicated and then inserted in the operand stack 3 words down. The set of JVM opcode(s) that can achieve this same function will depend on the values that occupy the top 3 words of operand stack. For instance, if the top 3 words of the operand stack are occupied by one 16-bit value and one 32-bit value, the effect of the dup_x 51 (0x33) opcode can be replicated by a the JVM opcode dup2. The dup2 opcode duplicates the top two operand stack values. However, in other scenarios multiple JVM opcodes may be required to achieve the same effect as the dup_x 51 (0x33) opcode. For instance, assume that the top three words of the operand stack are three 16-bit values. In this scenario, there is no single JVM opcode that can duplicate the top three 16-bit values and insert the duplicated values three values down (i.e., the effect of a dup_x 51 (0x33) opcode). The remainder of this Section 5.2 will describe a series of JVM opcodes that may be executed to achieve the same effect as the dup_x 51 (0x33) opcode in this example application. For purposes of clarity and explanation, this Section 5.2 assumes that the top six words of the operand stack hold six values such that the operand stack may be represented as: value 6, value 5, value 4, value 3, value 2, value 1. In this representation, value 1 is the top word of the operand stack.

In an embodiment, a virtual machine executes the JVM opcode dup2_x1 (Operation 1002). The dup2_x1 opcode causes the top two operand stack values to be duplicated and inserted three values down such that the operand stack can now be represented as: value 6, value 5, value 4, value 2, value 1, value 3, value 2, value 1.

In an embodiment, the system executes the JVM opcode pop2 (Operation 1004). The pop2 opcode causes the top two operand stack values to be popped from the stack such that the operand stack can now be represented as: value 6, value 5, value 4, value 2, value 1, value 3.

In an embodiment, the system executes the JVM opcode dup_x2 (Operation 1006). The dup_x2 opcode causes the top operand stack value to be duplicated and inserted three values down such that the operand stack can now be represented as: value 6, value 5, value 4, value 3, value 2, value 1, value 3.

In an embodiment, the system executes the JVM opcode dup_x2 (Operation 1008). The dup_x2 opcode causes the top operand stack value to be duplicated and inserted three values down such that the operand stack can now be represented as: value 6, value 5, value 4, value 3, value 3, value 2, value 1, value 3.

In an embodiment, the system executes the JVM opcode pop (Operation 1010). The pop opcode causes the top operand stack value to pop from the stack such that the operand stack can now be represented as: value 6, value 5, value 4, value 3, value 3, value 2, value 1.

In an embodiment, the system executes the JVM opcode dup2_x1 (Operation 1012). The dup2_x1 opcode causes the top two operand stack values to be duplicated and inserted three values down such that the operand stack can now be represented as: value 6, value 5, value 4, value 3, value 2, value 1, value 3, value 2, value 1.

6. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 11:
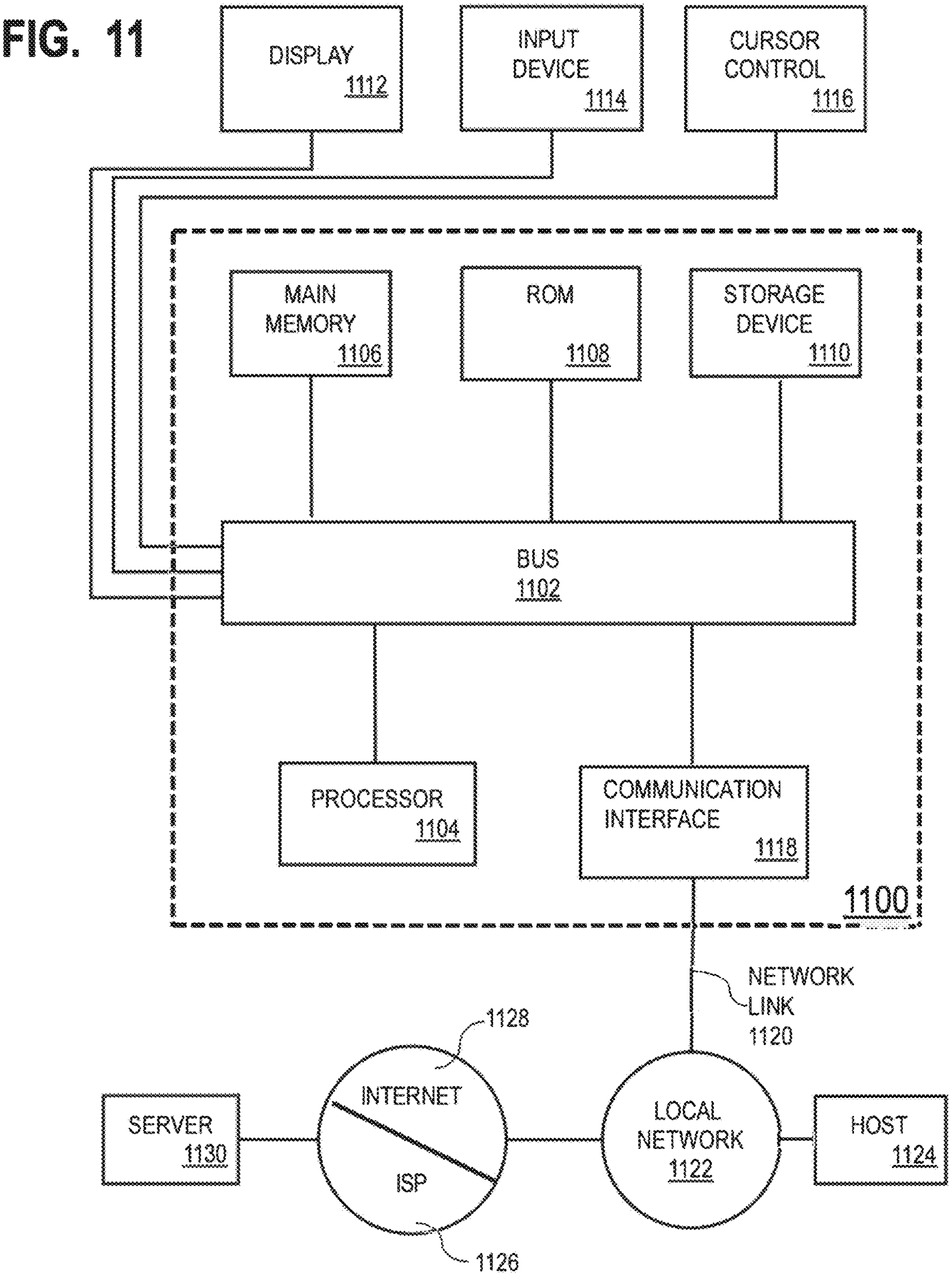
FIG. 11 illustrates a computer system in block diagram form according to an embodiment.

For example, FIG. 11 is a block diagram that illustrates a computer system 1100 that an embodiment of the invention may be implemented upon. Computer system 1100 includes a bus 1102 or other communication mechanism for communicating information, and a hardware processor 1104 coupled with bus 1102 for processing information. Hardware processor 1104 may be, for example, a general purpose microprocessor.

Computer system 1100 also includes a main memory 1106, such as a random access memory (RAM) or other dynamic storage device, coupled to bus 1102 for storing information and instructions to be executed by processor 1104. Main memory 1106 also may be used for storing temporary variables or other intermediate information during execution of instructions to be executed by processor 1104. Such instructions, when stored in non-transitory storage media accessible to processor 1104, render computer system 1100 into a special-purpose machine that is customized to perform the operations specified in the instructions.

Computer system 1100 further includes a read only memory (ROM) 1108 or other static storage device coupled to bus 1102 for storing static information and instructions for processor 1104. A storage device 1110, such as a magnetic disk or optical disk, is provided and coupled to bus 1102 for storing information and instructions.

Computer system 1100 may be coupled via bus 1102 to a display 1112, such as a cathode ray tube (CRT), for displaying information to a computer user. An input device 1114, including alphanumeric and other keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane.

Computer system 1100 may implement the techniques described herein using customized hard-wired logic, one or more ASICs or FPGAs, firmware and/or program logic that in combination with the computer system causes or programs computer system 1100 to be a special-purpose machine. According to one embodiment, the techniques herein are performed by computer system 1100 in response to processor 1104 executing one or more sequences of one or more instructions contained in main memory 1106. Such instructions may be read into main memory 1106 from another storage medium, such as storage device 1110. Execution of the sequences of instructions contained in main memory 1106 causes processor 1104 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1110. Volatile media includes dynamic memory, such as main memory 1106. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 1102. Transmission media can also take the form of acoustic or light waves, such as those generated during radio-wave and infra-red data communications.

Various forms of media may be involved in carrying one or more sequences of one or more instructions to processor 1104 for execution. For example, the instructions may initially be carried on a magnetic disk or solid state drive of a remote computer. The remote computer can load the instructions into its dynamic memory and send the instructions over a telephone line using a modem. A modem local to computer system 1100 can receive the data on the telephone line and use an infra-red transmitter to convert the data to an infra-red signal. An infra-red detector can receive the data carried in the infra-red signal and appropriate circuitry can place the data on bus 1102. Bus 1102 carries the data to main memory 1106, that processor 1104 retrieves and executes the instructions from. The instructions received by main memory 1106 may optionally be stored on storage device 1110 either before or after execution by processor 1104.

Computer system 1100 also includes a communication interface 1118 coupled to bus 1102. Communication interface 1118 provides a two-way data communication coupling to a network link 1120 that is connected to a local network 1122. For example, communication interface 1118 may be an integrated services digital network (ISDN) card, cable modem, satellite modem, or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126 in turn provides data communication services through the worldwide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, that carry the digital data to and from computer system 1100, are example forms of transmission media.

Computer system 1100 can send messages and receive data, including program code, through the network(s), network link 1120 and communication interface 1118. In the Internet example, a server 1130 might transmit a requested code for an application program through Internet 1128, ISP 1126, local network 1122 and communication interface 1118.

The received code may be executed by processor 1104 as it is received, and/or stored in storage device 1110, or other non-volatile storage for later execution.

7. Miscellaneous; Extensions

Unless otherwise defined, all terms (including technical and scientific terms) are to be given their ordinary and customary meaning to a person of ordinary skill in the art and are not to be limited to a special or customized meaning unless expressly so defined herein.

This application may include references to certain trademarks. Although the use of trademarks is permissible in patent applications, the proprietary nature of the marks should be respected, and every effort made to prevent their use in any manner that might adversely affect their validity as trademarks.

Embodiments are directed to a system with one or more devices that include a hardware processor and that are configured to perform any of the operations described herein and/or recited in any of the claims below.

In an embodiment, one or more non-transitory computer-readable storage media comprises instructions that, when executed by one or more hardware processors, cause performance of any of the operations described herein and/or recited in any of the claims.

In an embodiment, a method comprises operations described herein and/or recited in any of the claims, the method being executed by at least one device including a hardware processor.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form that such claims issue, including any subsequent correction.

What is claimed is:

1. A method comprising:

determining a hierarchy of a plurality of types that are comprised within a dataset that accords to a first format, wherein the first format is configured for a resource-constrained environment;

based on the hierarchy of the plurality of types, determining that two or more methods respectively comprised within two or more types are occurrences of a same method, wherein the two or more types are comprised within the plurality of types; and converting the dataset from the first format to a second format, wherein converting the dataset comprises:

based on determining that the two or more methods are occurrences of the same method, assigning a common name to the two or more methods, wherein the method is performed by at least one device including a hardware processor.

2. The method of claim 1, wherein converting the dataset further comprises:

replacing a first set of one or more opcodes comprised within a method with a second set of one or more opcodes, wherein the method is comprised within the two or more methods, the first set of one or more opcodes is associated with the first format, and the second set of one or more opcodes is associated with the second format;

simulating an execution of the second set of one or more opcodes to determine one or more predicted configurations of local variables that result from executing the second set of one or more opcodes; and based on the one or more predicted configurations of local variables, altering one or more local variable references comprised within the method.

3. The method of claim 2, wherein the first set of one or more opcodes comprises a first opcode from a first opcode vocabulary, wherein a second opcode vocabulary does not comprise an opcode that is functionally equivalent to the first opcode, wherein the first opcode vocabulary corresponds to the first format, wherein the second opcode vocabulary corresponds to the second format, and further comprising:

prior to replacing the first set of one or more opcodes with the second set of one or more opcodes:

determining a combination of opcodes from the second opcode vocabulary that can replicate a function of the first opcode, wherein the combination of opcodes from the second opcode vocabulary is comprised with the second set of one or more opcodes.

4. The method of claim 2, wherein simulating the execution of the second set of one or more opcodes comprises:

simulating a first execution of a first opcode to determine a first predicted configuration of local variables that results from executing the first opcode, wherein the first opcode and a second opcode are comprised within the second set of one or more opcodes;

based on the first predicted configuration of the local variables, simulating a second execution of the second opcode to determine a second predicted configuration of the local variables that results from executing the second opcode after the first opcode.

5. The method of claim 4, wherein altering the one or more local variable references comprises:

based on the first predicted configuration of the local variables, altering a first local variable reference, wherein the first local variable reference is comprised within bytecode instructions of the method; and based on the second predicted configuration of the local variables, altering a second local variable reference, wherein the second local variable reference is comprised within the bytecode instructions of the method subsequent to the first local variable reference.

6. The method of claim 1, wherein a first method of the two or more methods is comprised within a first type of the two or more types, and further comprising:

prior to determining that the two or more methods respectively comprised within the two or more types are occurrences of the same method:

selecting, for a name determination process, the first method instead of a second method that is comprised within a second type, wherein the first type is above the second type in the hierarchy of the plurality of types; and prior to assigning the common name to the two or more methods:

determining the common name.

7. One or more non-transitory computer-readable media comprising instructions that, when executed by one or more hardware processors, cause performance of operations comprising:

determining a hierarchy of a plurality of types that are comprised within a dataset that accords to a first format, wherein the first format is configured for a resource-constrained environment;

based on the hierarchy of the plurality of types, determining that two or more methods respectively comprised within two or more types are occurrences of a same method, wherein the two or more types are comprised within the plurality of types; and converting the dataset from the first format to a second format, wherein converting the dataset comprises:

based on determining that the two or more methods are occurrences of the same method, assigning a common name to the two or more methods.

8. The one or more non-transitory computer-readable media of claim 7, wherein converting the dataset further comprises:

replacing a first set of one or more opcodes comprised within a method with a second set of one or more opcodes, wherein the method is comprised within the two or more methods, the first set of one or more opcodes is associated with the first format, and the second set of one or more opcodes is associated with the second format;

simulating an execution of the second set of one or more opcodes to determine one or more predicted configurations of local variables that result from executing the second set of one or more opcodes; and based on the one or more predicted configurations of local variables, altering one or more local variable references comprised within the method.

9. The one or more non-transitory computer-readable media of claim 8, wherein the first set of one or more opcodes comprises a first opcode from a first opcode vocabulary, wherein a second opcode vocabulary does not comprise an opcode that is functionally equivalent to the first opcode, wherein the first opcode vocabulary corresponds to the first format, wherein the second opcode vocabulary corresponds to the second format, and wherein the operations further comprise:

prior to replacing the first set of one or more opcodes with the second set of one or more opcodes:

determining a combination of opcodes from the second opcode vocabulary that can replicate a function of the first opcode, wherein the combination of opcodes from the second opcode vocabulary is comprised within the second set of one or more opcodes.

10. The one or more non-transitory computer-readable media of claim 8, wherein simulating the execution of the second set of one or more opcodes comprises:

simulating a first execution of a first opcode to determine a first predicted configuration of local variables that results from executing the first opcode, wherein the first opcode and a second opcode are comprised within the second set of one or more opcodes; and based on the first predicted configuration of the local variables, simulating a second execution of the second opcode to determine a second predicted configuration of the local variables that results from executing the second opcode after the first opcode.

11. The one or more non-transitory computer-readable media of claim 10, wherein altering the one or more local variable references comprises:

based on the first predicted configuration of the local variables, altering a first local variable reference, wherein the first local variable reference is comprised within bytecode instructions of the method; and based on the second predicted configuration of the local variables, altering a second local variable reference, wherein the second local variable reference is comprised within the bytecode instructions of the method subsequent to the first local variable reference.

12. The one or more non-transitory computer-readable media of claim 7, wherein a first method of the two or more methods is comprised within a first type of the two or more types, and wherein the operations further comprise:

prior to determining that the two or more methods respectively comprised within the two or more types are occurrences of the same method:

selecting, for a name determination process, the first method instead of a second method that is comprised within a second type, wherein the first type is above the second type in the hierarchy of the plurality of types; and prior to assigning the common name to the two or more methods:

determining the common name.

13. The one or more non-transitory computer-readable media of claim 12, wherein the first format is a converted applet (CAP) file format, wherein the second format is a class file format, wherein the two or more types are abstractly related by at least one of (a) extension or (b) implementation, wherein the dataset was previously converted from the class file format to the CAP file format, wherein the common name is an original name that was assigned to the two or more methods prior to the dataset being converted from the class file format to the CAP file format, wherein the dataset is associated with an export file, and wherein determining the common name comprises: accessing the original name from the export file based on a first numbered token that represents the first method in the dataset.

14. The one or more non-transitory computer-readable media of claim 12, wherein the first format is a CAP file format, wherein the second format is a class file format, wherein the two or more types are abstractly related by at least one of (a) extension or (b) implementation, and wherein determining the common name comprises:

determining that an original name of the two or more methods cannot be accessed; and based on determining that the original name cannot be accessed:

generating the common name based on a first numbered token that represents the first method in the dataset, wherein the first type is above any other type that is comprised within the two or more types in the hierarchy of the plurality of types.

15. One or more non-transitory computer readable-media comprising instructions that, when executed by one or more hardware processors, cause performance of operations comprising:

replacing a first set of one or more opcodes comprised within a method with a second set of one or more opcodes, wherein the first set of one or more opcodes is associated with a first format, and the second set of one or more opcodes is associated with a second format;

simulating an execution of the second set of one or more opcodes to determine one or more predicted configurations of local variables that result from executing the second set of one or more opcodes; and based on the one or more predicted configurations of local variables, altering one or more local variable references comprised within the method.

16. The one or more non-transitory computer-readable media of claim 15, wherein the first set of one or more opcodes comprises a first opcode from a first opcode vocabulary, wherein there is no opcode in a second opcode vocabulary that is functionally equivalent to the first opcode, wherein the first opcode vocabulary corresponds to the first format, wherein the second opcode vocabulary corresponds to the second format, and wherein the operations further comprise:

prior to replacing the first set of one or more opcodes with the second set of one or more opcodes:

determining a combination of opcodes from the second opcode vocabulary that can replicate a function of the first opcode, wherein the combination of opcodes from the second opcode vocabulary is comprised with the second set of opcodes.

17. The one or more non-transitory computer-readable media of claim 15, wherein simulating the execution of the second set of one or more opcodes comprises:

simulating a first execution of a first opcode to determine a first predicted configuration of the local variables that results from executing the first opcode, wherein the first opcode and a second opcode are comprised within the second set of one or more opcodes, wherein the first set of one or more opcodes is associated with a first format that is configured for a resource-constrained environment, and the second set of opcodes is associated with a second format; and based on the first predicted configuration of the local variables, simulating a second execution of the second opcode to determine a second predicted configuration of the local variables that results from executing the second opcode after the first opcode.

18. The one or more non-transitory computer-readable media of claim 17, wherein altering the one or more local variable references comprises:

based on the first predicted configuration of the local variables, altering a first local variable reference, wherein the first local variable reference is comprised within bytecode instructions of the method; and based on the second predicted configuration of the local variables, altering a second local variable reference, wherein the second local variable reference is comprised within the bytecode instructions of the method subsequent to the first local variable reference.

19. The one or more non-transitory computer-readable media of claim 15, wherein the method is comprised within a dataset that accords to a CAP file format, wherein the dataset was previously converted from a class file format to the CAP file format, and wherein the second set of one or more opcodes were replaced by the first set of one or more opcodes when the dataset was converted from the class file format to the CAP file format.

20. The one or more non-transitory computer-readable media of claim 15, wherein the operations further comprise:

determining a hierarchy of a plurality of types, wherein the plurality of types comprises a first type, and the first type comprises the method;

selecting, for a name determination process, the method instead of a second method that is comprised within a second type, wherein the first type is above the second type in the hierarchy of the plurality of types; and based on the hierarchy of the plurality of types, determining that two or more methods respectively comprised within two or more types are occurrences of a same method, wherein the first type is comprised within the two or more types, the method is comprised within the two or methods, and the two or more types are abstractly related; and based on determining that the two or more methods are occurrences of the same method, determining a common name for the two or more methods, wherein the determining the common name for the two or more methods comprises at least one of: (a) accessing an original name of the two or more methods or (b) generating a new name for the two or more methods.

* * * * *